United States Patent
Ukai et al.

(10) Patent No.: US 10,304,369 B2
(45) Date of Patent: May 28, 2019

(54) IMAGE DISPLAY DEVICE HAVING A LIGHT SOURCE AND A CONTROL UNIT CONFIGURED TO CONTROL A DRIVING CURRENT AT FIRST AND SECOND GRADATION VALUES

(71) Applicant: Hitachi-LG Data Storage, Inc., Tokyo (JP)

(72) Inventors: Ryuji Ukai, Tokyo (JP); Yoshiho Seo, Tokyo (JP); Yuya Ogi, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 83 days.

(21) Appl. No.: 15/471,295

(22) Filed: Mar. 28, 2017

(65) Prior Publication Data

US 2017/0287375 A1  Oct. 5, 2017

(30) Foreign Application Priority Data

Mar. 29, 2016  (JP) .................... 2016-065691

(51) Int. Cl.
*G09G 3/02* (2006.01)
*G09G 3/00* (2006.01)
*H04N 9/31* (2006.01)

(52) U.S. Cl.
CPC .............. *G09G 3/02* (2013.01); *G09G 3/002* (2013.01); *G09G 3/025* (2013.01); *H04N 9/3185* (2013.01); *G09G 2310/0272* (2013.01); *G09G 2310/08* (2013.01); *G09G 2320/0233* (2013.01); *G09G 2320/0242* (2013.01); *G09G 2320/0271* (2013.01); *G09G 2330/025* (2013.01); *G09G 2360/147* (2013.01)

(58) Field of Classification Search
CPC ............ G09G 3/02; G09G 3/00; G09G 3/025; G09G 2310/0272; G09G 2310/08; G09G 2320/0233; G09G 2320/0242; G09G 2320/0271; G09G 2330/025; G09G 2330/147; H04N 5/74
See application file for complete search history.

(56) References Cited

U.S. PATENT DOCUMENTS

2009/0167193 A1* 7/2009 Ogasawara .......... G09G 3/3406
315/151
2011/0241571 A1  10/2011 Maeda et al.

FOREIGN PATENT DOCUMENTS

| CN | 101460986 A | 6/2009 |
|----|-------------|--------|
| JP | 63-138792 A | 6/1988 |
| JP | 2003-5110 A | 1/2003 |
| JP | 2008-66321 A | 3/2008 |

(Continued)

OTHER PUBLICATIONS

Chinese Office Action received in corresponding Chinese Application No. 201710187939.7 dated Jun. 21, 2018.

(Continued)

*Primary Examiner* — Lisa S Landis
(74) *Attorney, Agent, or Firm* — Mattingly & Malur, PC

(57) ABSTRACT

An image display device includes: a light source configured to change the amount of light, depending on a driving current; and a control unit configured to, when a change is made from a first gradation value to a second gradation value, control the driving current at the second gradation value, depending on a time period for which the first gradation value is set.

16 Claims, 15 Drawing Sheets

(56) References Cited

FOREIGN PATENT DOCUMENTS

| JP | 2010-117496 A | 5/2010 |
| JP | 2011-216662 A | 10/2011 |
| JP | 2011-253843 A | 12/2011 |
| JP | 2012-40779 A | 3/2012 |

OTHER PUBLICATIONS

Japanese Office Action received in corresponding Japanese Application No. 2016-065691 dated Feb. 19, 2019.

* cited by examiner ical Field
The present invention relates to an image display device.

BACKGROUND

JP 2010-117496 A discloses "a light source driving device, a projector device, and a display device without degradation of uniformity of displayed images even when current values for driving light sources undergo rapid changes."

SUMMARY OF INVENTION

Technical Problem

According to the method disclosed in JP 2010-117496, it is possible to reduce luminance unevenness of images by compensating for the voltage fluctuation of a driving power source for a laser diode, even when images to be displayed vary in gradation value.

However, the laser diode has response characteristics of varying in the amount of output light in response to the previous current transition, even when a constant current is applied to the laser diode without any voltage fluctuation of the driving power source. For this reason, the laser diode has the problem of causing luminance unevenness of images.

Therefore, an object of the present invention is to provide a technique for reducing luminance unevenness of an image.

Solution to Problem

The present application includes multiple means for solving at least a part of the problem mentioned above, and an example thereof is provided as follows. In order to solve the problem mentioned above, an image display device according to the present invention includes: a light source configured to change the amount of light, depending on a driving current; and a control unit configured to, when a change is made from a first gradation value to a second gradation value, control the driving current at the second gradation value, depending on a time period for which the first gradation value is set.

Advantageous Effects of Invention

According to the present invention, luminance unevenness of an image can be reduced. Objects, configurations, and advantageous effects other than the foregoing will be made evident from the following description of embodiments.

DESCRIPTION OF EMBODIMENTS

Embodiments of the present invention will be described below with reference to the drawings.

First Embodiment

Figure 1:
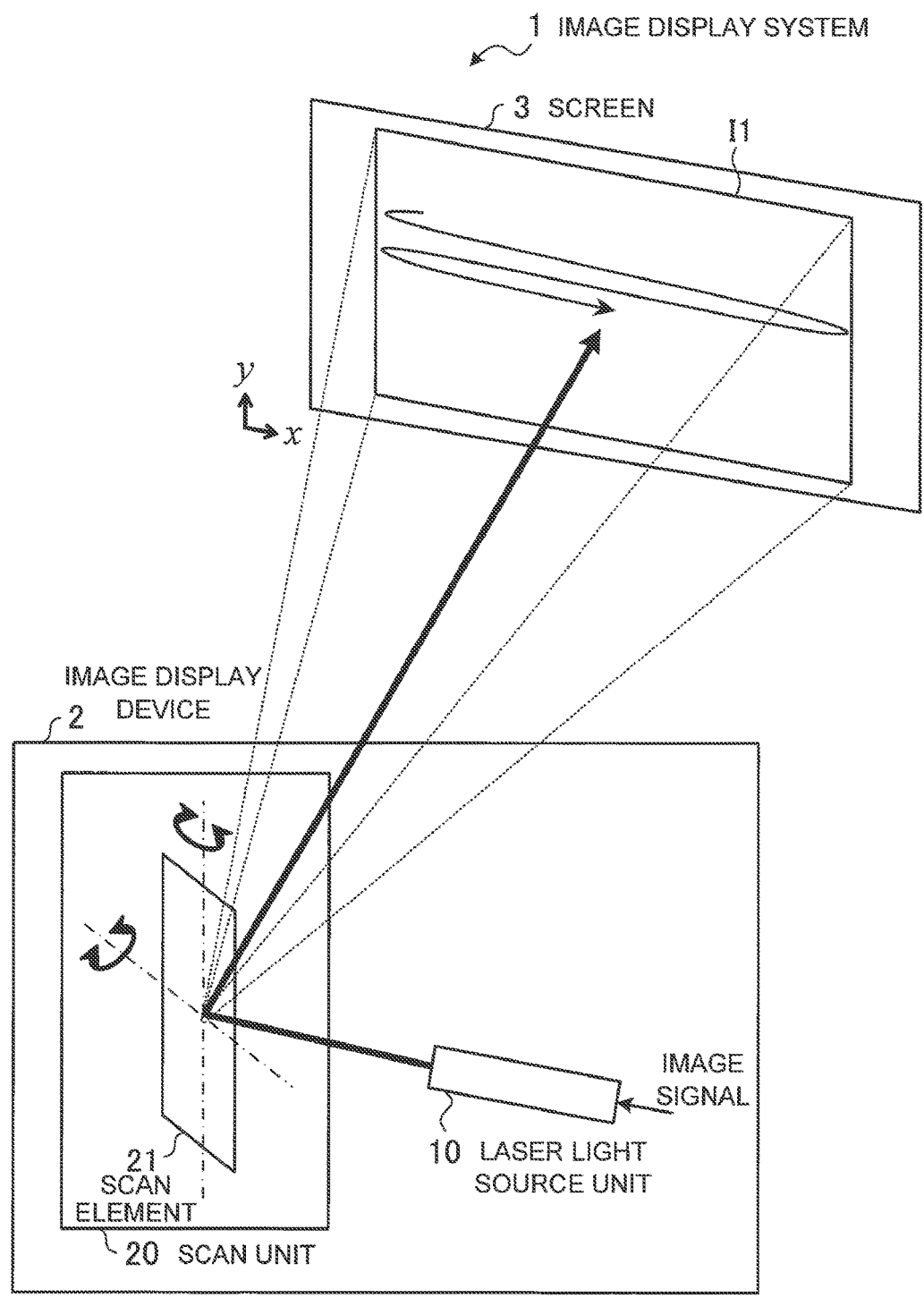
FIG. 1 is a diagram illustrating a configuration example of an image display system according to a first embodiment.

FIG. 1 is a diagram illustrating a configuration example of an image display system 1 according to a first embodiment. As shown in FIG. 1, the image display system 1 has an image display device 2 and a screen 3.

The image display device 2 is a laser scanning-type image display device that scans the screen 3 with laser light to display images thereon. The image display device 2 has a laser light source unit 10 and a scan unit 20.

Image signals of images to be displayed on the screen 3 are input to the laser light source unit 10. The laser light source unit 10 emits, to the scan unit 20, laser light modulated with the image signals input.

The scan unit 20 has a scan element 21. The scan element 21 has a mirror surface that reflects laser light emitted from the laser light source unit 10, to the screen 3.

The mirror surface of the scan element 21 rotates around two axes for two-dimensionally scanning the screen 3 with laser light. For example, the mirror surface of the scan element 21 rotates around a rotation axis (which may be hereinafter referred to as a first axis) for scanning the screen 3 with laser light in the y direction (vertical direction), and a rotation axis (which may be hereinafter referred to as a second axis) for scanning the screen 3 with laser light in the x direction (horizontal direction). The first axis and the second axis are, for example, perpendicular to each other.

In this regard, the frame rate (the number of screen rewrites per second) for images to be displayed on the screen 3 is denoted by "f", the number of pixels in the x direction is denoted by "H", and the number of pixels in the y direction is denoted by "V". The scan unit 20 rotates the first axis (the axis for y-direction scanning) of the scan element 21, for scanning with laser light once in the y direction in one frame period "1/f". In addition, the scan unit 20 rotates the second axis (the axis for x-direction scanning), for scanning with laser light V times in the x direction in one frame period "1/f". The scan timing in the y direction and the x direction is synchronized with image signals for modulating laser light in the laser light source unit 10.

In this way, the image display device 2 performs scanning for one frame that has H pixels in the x direction and V pixels in the y direction, and repeats the scanning for one frame. Thus, an image I1 corresponding to the image signals is displayed on the screen 3.

It is to be noted that one or both of the first axis and second axis of the scan element 21 may, depending on the scan pattern on the screen 3, rotate in only one direction (for example, only a clockwise rotation) in some cases, or rotate repeatedly in both directions (for example, repetition of clockwise rotation and anticlockwise rotation within 360 degrees) in some cases.

Further, the scan unit 20 is adapted to have the scan element 21 in FIG. 1, but not to be considered limited thereto. For example, the scan unit 20 may have two scan elements each including a mirror surface, and the two scan elements may each have a rotation axis. The two rotation axes correspond to the first axis and second axis described above, and the respective mirror surfaces of the two scan elements rotate themselves to scan the screen 3 with laser light in the y direction and the x direction.

Figure 2:
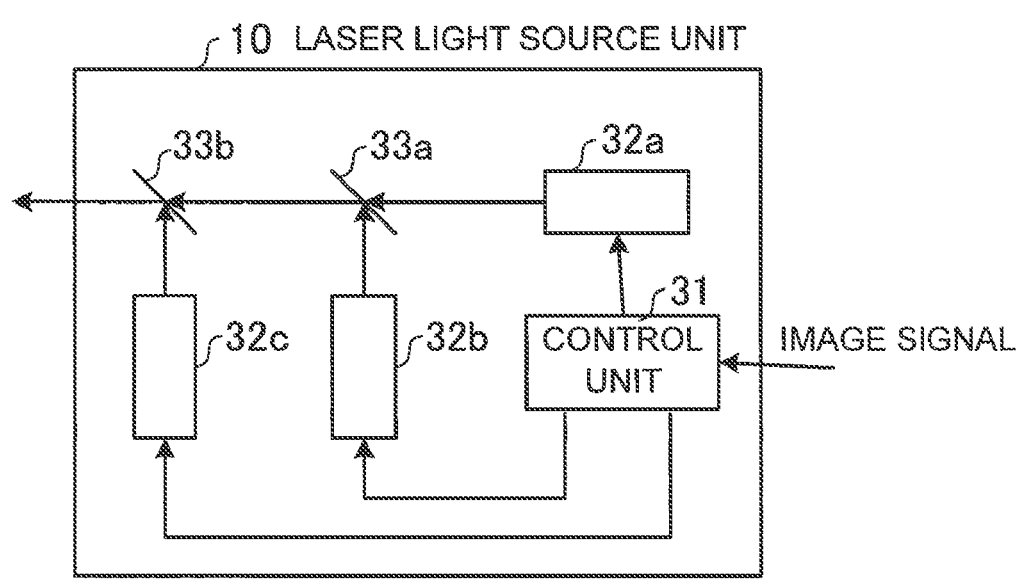
FIG. 2 is a diagram illustrating a block configuration example of a laser light source unit.

FIG. 2 is a diagram illustrating a block configuration example of the laser light source unit 10. As shown in FIG. 2, the laser light source unit 10 has a control unit 31, laser light sources 32a, 32b, and 32c, and dichroic mirrors 33a and 33b. Hereinafter, when there is no need to distinguish the laser light sources 32a, 32b, and 32c from each other, the laser light sources 32a, 32b, and 32c will be collectively referred to as a laser light source 32.

The control unit 31 controls the whole laser light source unit 10. The functions of the control unit 31 are achieved by a CPU (Central Processing Unit) or a custom IC (Integrated Circuit) such as an ASIC (Application Specific Integrated Circuit).

Image signals are input to the control unit 31. The image signals contain therein, for example, information on gradation values of R (red), G (green), and B (blue) for each pixel for each frame. As will be described in detail below, the control unit 31 controls the laser light sources 32a, 32b, and 32c such that laser with amounts of light corresponding to the gradation values of R, G, and B is emitted from the laser light sources 32a, 32b, and 32c.

The laser light sources 32a, 32b, and 32c are, for example, laser diodes (LD). The laser light sources 32a, 32b, and 32c emit laser light in accordance with currents (driving currents) output from the control unit 31.

The laser light sources 32a, 32b, and 32c respectively emit laser light of different colors. For example, the laser light source 32a emits laser light of "R", the laser light source 32b emits laser light of "G", and the laser light source 32c emits laser light of "B". It is to be noted that the laser light sources 32a, 32b, and 32c may emit laser light of any of the colors.

The dichroic mirrors 33a and 33b combine the light emitted by the laser light source 32. The laser light source and the dichroic mirrors 33a and 33b are arranged such that laser light of the three colors travels substantially with one optical axis substantially in one direction.

It is to be noted that the laser light source unit 10 is adapted to perform full-color display of the image I1 with the use of laser light of the three colors "R, G, B" as described above, but not to be considered limited thereto. The laser light source unit 10 may, with an optical system simplified, display the image I1 with the use of laser light of a single color or two colors. Alternatively, the laser light source unit 10 may use multiple laser light sources per color in order to increase the light output intensity.

In this regard, in order to display, on the screen 3, high-quality images without luminance unevenness, the control unit 31 needs to control the laser light source 32 so as to provide the same luminance when pixels for display have the same gradation value, regardless of pixel locations in images. The amount of light released by the laser light source 32 is controlled in accordance with the amount of current flowing through the laser light source 32 (LD), and the control unit 31 thus controls the amount of current applied to the laser light source 32, so as to provide the same luminance on the screen 3 when pixels for display have the same gradation value.

As long as the current applied to the laser light source 32 and the amount of light released by the laser light source 32 correspond to each other on a one-to-one basis without any change with time, the control unit 31 can drive the laser light source 32 in accordance with the current value determined on the basis of gradation values contained in image signals. However, as will be explained next, the relationship between the current applied to the laser light source 32 and the forward voltage of the laser light source 32 changes with time, and likewise, the relationship between the current applied to the laser light source 32 and the amount of light released by the laser light source 32 also changes with time.

Figure 3:
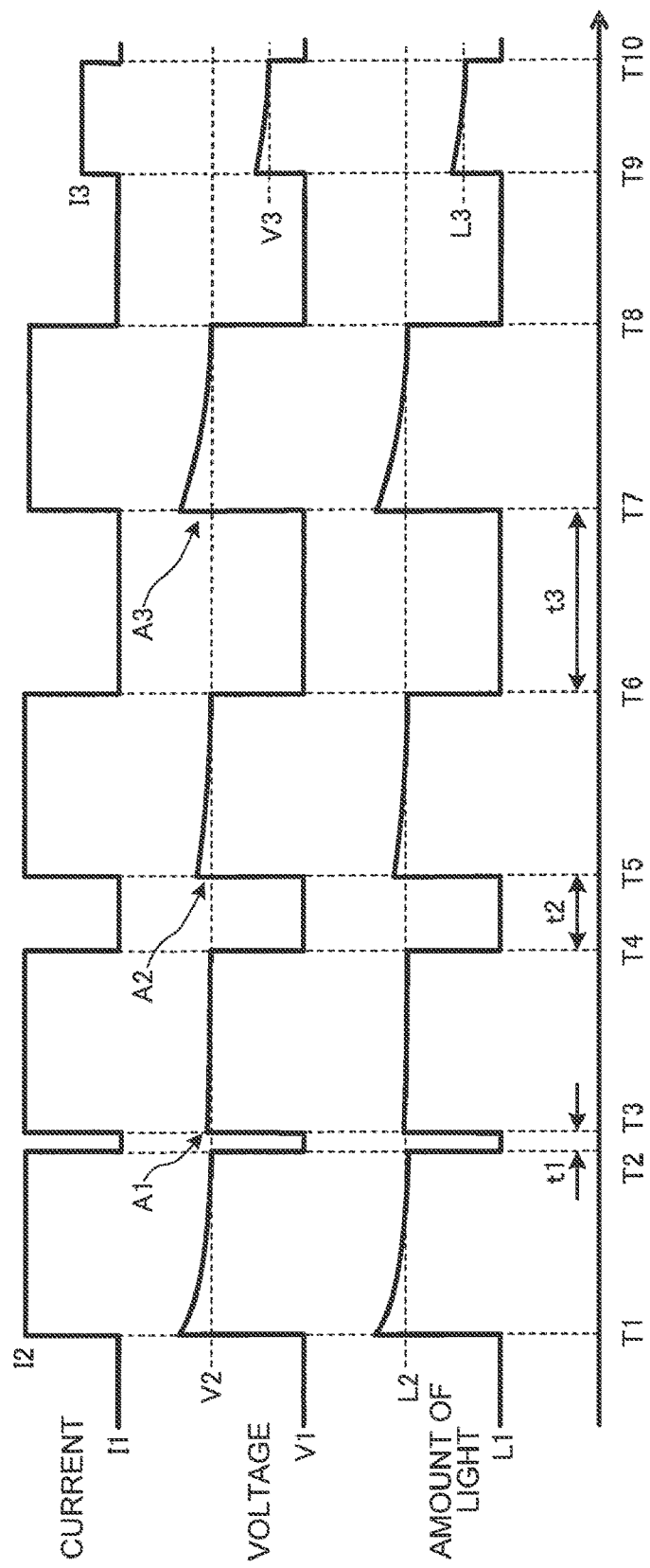
FIG. 3 is a diagram showing examples of changes with time in the current applied to a laser light source, the forward voltage of the laser light source, and the amount of light released by the laser light source.

FIG. 3 is a diagram showing examples of changes with time in the current applied to the laser light source 32, the forward voltage of the laser light source 32, and the amount of light released by the laser light source 32. The horizontal axis shown in FIG. 3 indicates time. The "current" shown in FIG. 3 indicates the current applied to the laser light source 32. The "voltage" shown in FIG. 3 indicates the forward voltage generated in the laser light source 32. The "amount of light" shown in FIG. 3 indicates the amount of light released by the laser light source 32.

Prior to time "T1" in FIG. 3, a constant current "I1" is assumed to flow through the laser light source 32, and the forward voltage is assumed to be "V1". From this steady state, the current applied to the laser light source 32 is assumed to be changed to "I2" (I2>I1) at the time "T1". In this case, the forward voltage of the laser light source 32 will undergo an overshoot, and then converge to a voltage "V2" in an exponential fashion. The time constant of the convergence from the overshoot varies depending on the laser light source 32, but is, for example, 10 ns to 10 ms.

After the forward voltage of the laser light source 32 converges to the voltage "V2", the current applied to the laser light source 32 is assumed to be changed to the "I1" at time "T2". Then, the current applied to the laser light source 32 is assumed to be changed to the "I2" at time "T3" (T3=T2+t1). The time "t1" is assumed to be adequately short (t1<<Tc) as compared with a predetermined time constant "Tc" (the time period for saturation of the overshoot amount of the forward voltage). Also in this case, the forward voltage of the laser light source 32 will undergo an overshoot, and then converge to the voltage "V2", but the overshoot amount is smaller as compared with the overshoot amount at the time "T1" (saturated overshoot amount).

The overshoot amount of the forward voltage of the laser light source 32 is increased as the time period until the change from the "I1" to the "I2" is longer after the current is changed from the "I2" to the "I1". For example, as the time period until the change of the current from the "I1" to the "I2" is longer as shown at the time periods "t1", "t2", and "t3" in FIG. 3, the overshoot amount of the forward voltage of the laser light source 32 is larger as shown by arrows A1, A2, and A3 in FIG. 3.

It is to be noted that when the time period until the change of the current from the "I1" to the "I2" after the change thereof from the "I2" to the "I1" is adequately long as compared with the time constant "Tc", the overshoot amount is saturated up to a predetermined amount. For example, in FIG. 3, with "T7−T6>>Tc", the overshoot amount at the time "T7" is equal to the overshoot amount (saturated overshoot amount) at the time "T1".

The amount of light released by the laser light source 32 will undergo an overshoot in response to the overshoot of the forward voltage of the laser light 32. For example, when the current is changed from the "I1" to the "I2", the amount of light released by the laser light source 32 will undergo an overshoot. Then, the amount of light with the overshoot will gradually converge to the amount of light "L2". The overshoot amount of the amount of light is increased in proportion to the overshoot amount of the forward voltage.

As shown from time "T8" to time "T9", the current is assumed to be changed to a current "I3" (I1<I3<I2) at the time "T9" after applying the current "I1" to the laser light source 32 for an adequately long period of time as compared with the time constant "Tc". In this case, the forward voltage of the laser light source 32 will undergo an overshoot, and then converge to a voltage "V3" (V1<V3<V2).

The overshoot amount of the forward voltage at the time "T9" is smaller as compared with the overshoot amount at the time "T1". Further, the overshoot amount of the amount of light at the time "T9" is also smaller as compared with the overshoot amount of the amount of light at the time "T1".

The magnitude of the current applied to the laser light source 32 is determined by the graduation values. Accordingly, in the case of a change made from a first gradation value to a second gradation value, the laser light source 32 varies in the overshoot amount of the amount of light, depending on the time period for which the first gradation value is set. For example, in the case of a change made from a gradation value for applying the current "I1" to a gradation value for applying the current "I2", the overshoot amount of the amount of light is increased as the time period for which the current "I1" flows is longer (as the time period for which the gradation value for applying the current "I1" is set is longer).

In addition, the laser light source 32 varies in the overshoot amount of the amount of light depending on the difference between the first gradation value and the second gradation value. More specifically, the increased change in the current applied to the laser light source 32 increases the overshoot amount of the forward voltage of the laser light source 32, and also increases the overshoot amount of the amount of light. For example, the overshoot amount of the amount of light in the case of a change made from a gradation value for applying the current "I1" to a gradation value for applying the current "I2" is larger than that in the case of a change made from the current "I1" to the current "I3".

It is to be noted that while the overshoots in the case of rapid increases in the current applied to the laser light source 32 have been described above, the forward voltage of the laser light source 32 will undergo an undershoot, and converge to a predetermined value in an exponential fashion in the case of a rapid decrease in the current applied to the laser light source 32.

Alternatively, depending on the laser light source 32, when the current applied to the laser light source 32 is increased or decreased rapidly, the forward voltage of the laser light source 32 may increase or decrease in a substantially instantaneous manner, and then converge to a predetermined voltage without any overshoot or undershoot, for example, as in overdamping.

In the case of the laser light source 32 which has such transient response characteristics, even when the same current is applied to the laser light source 32 at the same gradation value, the amount of light released by the laser light source 32 changes with time in response to the previous current transition. For this reason, the image I1 displayed on the screen 3 has luminance unevenness produced.

Therefore, the control unit 31 controls the current of the laser light source 32 in consideration of changes with time in the amount of light, thereby reducing luminance unevenness of the image I1. Explanations will be provided below, provided that the laser light source 32 has transient response characteristics in which the forward voltage undergoes an overshoot and converges to a predetermined voltage when the current increases rapidly.

Figure 4:
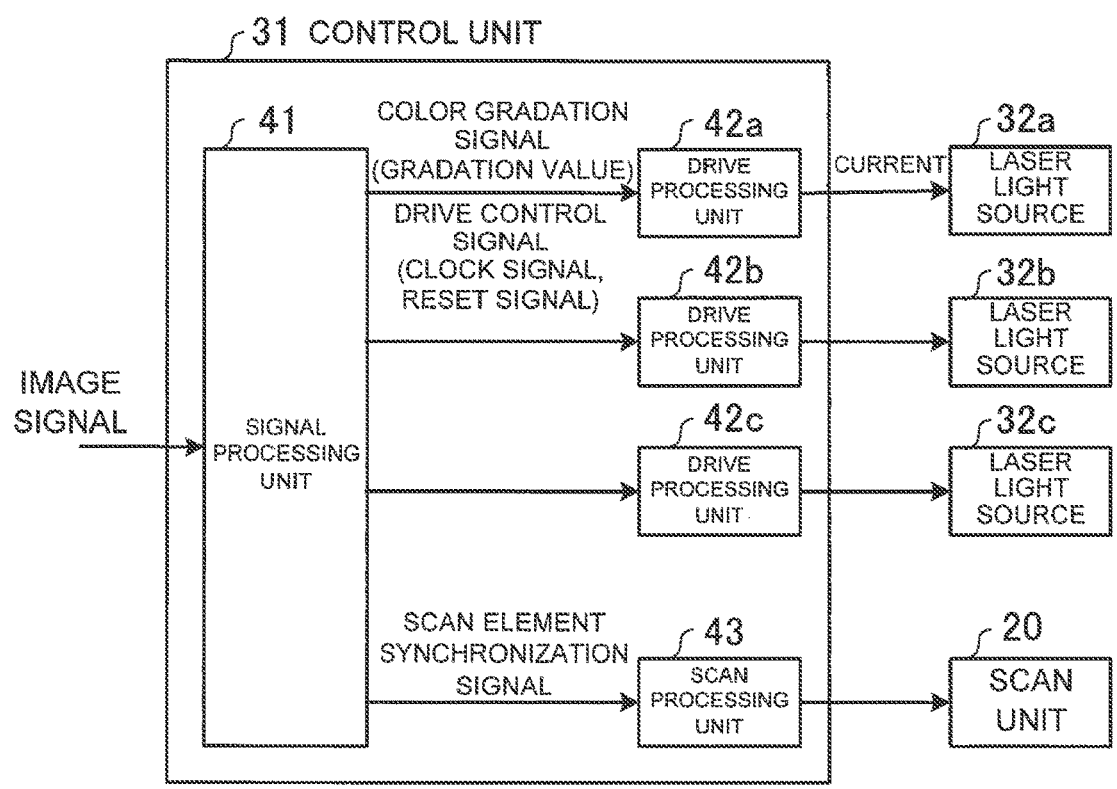
FIG. 4 is a diagram illustrating a block configuration example of a control unit.

FIG. 4 is a diagram illustrating a block configuration example of the control unit 31. In FIG. 4, the laser light source 32 shown in FIG. 2 and the scan unit 20 shown in FIG. 1 are shown in addition to the control unit 31. As shown in FIG. 4, the control unit 31 has a signal processing unit 41, drive processing units 42a, 42b, and 42c, and a scan processing unit 43. Hereinafter, when there is no need to distinguish the drive processing units 42a, 42b, and 42c from each other, the drive processing units 42a, 42b, and 42c will be collectively referred to as a drive processing unit 42.

Image signals are input to the signal processing unit 41. The signal processing unit 41 outputs scan element synchronization signals to the scan processing unit 43, on the basis of the input image signals.

The scan element synchronization signals are signals that control the rotation of the mirror surface of the scan unit 20, and control the scan timing of laser light emitted onto the screen 3. For example, the scan element synchronization signals are signals that indicate which pixel of the image I1 is drawn by laser light at predetermined time intervals.

In addition, the signal processing unit 41 outputs color gradation signals and drive control signals to each of the drive processing units 42a, 42b, and 42c, on the basis of the input image signals.

The color gradation signals output to each of the drive processing units 42a, 42b, and 42c contain therein a gradation value for any of R, G, and B. For example, the laser light source 32a is adapted to emit laser light of "R", the laser light source 32b is adapted to emit laser light of "G", and the laser light source 32c is adapted to emit laser light of "B". In this case, the color gradation signal output to the drive processing unit 42a contains therein a gradation value for "R", the color gradation signal output to the drive processing unit 42b contains therein a gradation value for "G", and the color gradation signal output to the drive processing unit 42c contains therein a gradation value for "B".

The drive control signal output to the drive processing unit 42 contains therein a reset signal that resets the operation of the drive processing unit 42, and a clock signal that controls the timing of processing executed by the drive processing unit 42.

The output of the color gradation signals and the drive control signals to the drive processing unit 42 is synchronized with the scan element synchronization signals output to the scan processing unit 43. The gradation values for R, G, and B, output to the drive processing unit 42, refer to gradation values for pixels directed by the scan element synchronization signals to execute drawing onto the screen 3.

The drive processing unit 42 generates, on the basis of color gradation signals output from the signal processing unit 41, currents for driving the laser light source 32, and outputs the currents to the laser light source 32.

The scan processing unit 43 generates, on the basis of scan element synchronization signals output from the signal processing unit 41, signals for driving the scan unit 20, and outputs the signals to the scan unit 20.

Figure 5:
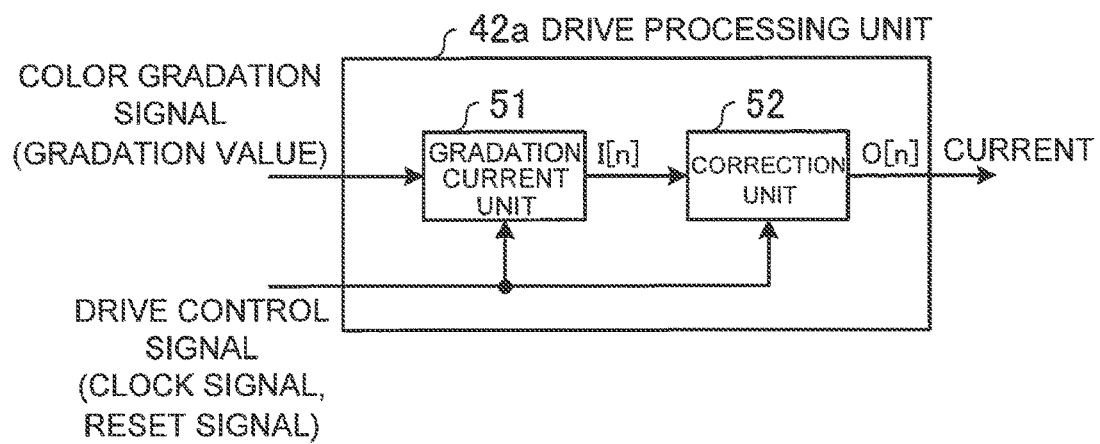
FIG. 5 is a diagram illustrating a block configuration example of a drive processing unit.

FIG. 5 is a diagram illustrating a block configuration example of the drive processing unit 42a. As shown in FIG. 5, the drive processing unit 42a has a gradation current unit 51 and a correction unit 52. It is to be noted that the drive processing units 42b and 42c also have the same block configuration example as the drive processing unit 42a shown in FIG. 5, and the explanation thereof will be left out.

The color gradation signal output from the signal processing unit 41 shown in FIG. 4 is input to the gradation current unit 51. The color gradation signal input to the gradation current unit 51 contain therein a gradation value for "R", for example.

The gradation current unit 51 has a current conversion look-up table (not shown) for converting a gradation value to a current value. Gradation values and current values corresponding to the gradation values are stored in the current conversion LUT (LUT: look-up table). On the basis of the gradation value contained in the color gradation signal input from the signal processing unit 41, the gradation current unit 51 refers to the current conversion LUT, and acquires a current value corresponding to the gradation value. The gradation current unit 51 outputs the acquired current value to the correction unit 52.

The correction unit 52 corrects the current value output from the gradation current unit 51. For example, the correction unit 52 corrects the current value output from the gradation current unit 51, so as to keep the forward voltage of the laser light source 32a from undergoing any overshoot. The correction unit 52 outputs the current of the corrected current value to the laser light source 32a.

Drive control signals are input from the signal processing unit 41 shown in FIG. 4 to the gradation current unit 51 and the correction unit 52. The gradation current unit 51 and the correction unit 52 operate on the basis of clock signals contained in the input drive control signals. In addition, the gradation current unit 51 and the correction unit 52 reset the operations thereof on the basis of reset signals contained in the input drive control signals.

The current value correction in the correction unit 52 will be described in detail. Hereinafter, the current value output from the gradation current unit 51 may be referred to as a previous stage current value, whereas the current value corrected by the correction unit 52 may be referred to as a subsequent stage current value. In addition, "n" is adapted to represent a counter of an integer that increases by "1" for each timing directed by a clock signal. In addition, when the counter has a value of "n", the previous stage current value is referred to as I[n], whereas the subsequent stage current value is referred to as O[n]. In addition, the correction value for correcting the previous stage current value I[n] and thus calculating the subsequent stage current value O[n] is referred to as P[n].

The correction unit 52 converts the previous stage current value I[n] output from the gradation current unit 51, to a correction gain value g(I[n]). The g(I[n]) has a value of 0 or more, and has a larger value as the value of the I[n] is larger.

For example, the correction unit 52 has a correction gain value LUT (not shown). The correction gain value LUT stores the I[n] and the correction gain value g that is larger as the I[n] is larger, which are adapted to correspond to each other. The correction unit 52 refers to the correction gain value LUT, thereby acquiring the correction gain value g(I[n]) corresponding to the previous stage current value I[n].

The correction unit 52 calculates the subsequent stage current value O[n] on the basis of the following formula (1), for each timing directed by a clock signal.

$$O[n]=I[n]-q(P[n],I[n]) \quad (1)$$

In this regard, the "q" in the second term of the right-hand side of the formula (1) is expressed by the following formula (2):

$$q(P[n],I[n])=g(I[n]) \cdot P[n] \quad (2)$$

In addition, the correction unit 52 calculates a new (next) correction value P[n+1] on the basis of the following formula (3), for each timing directed by a clock signal.

$$P[n+1]=f(P[n],I[n],n) \quad (3)$$

More specifically, the correction value P[n+1] is calculated on the basis of the previous correction value P[n] and the previous stage current value I[n].

It is to be noted that the "f" of the formula (3) represents a predetermined function, and the correction value changes as follows in accordance with the function f for each timing directed by a clock signal.

The correction value monotonically increases to Pmax that is an upper limit of the correction value, when the I[n] is [Imin].

The correction value monotonically decreases to "0" that is a lower limit of the correction value, when the I[n] is not [Imin].

The "Imin" refers to the minimum value of the current applied to the laser light source 32a. For example, the "Imin" refers to the current applied to the laser light source 32a when the gradation value is "0".

The correction unit 52 resets the correction value P[n+1] to "P0", when a reset signal is input. The "P0" refers to a predetermined constant.

Figure 6:
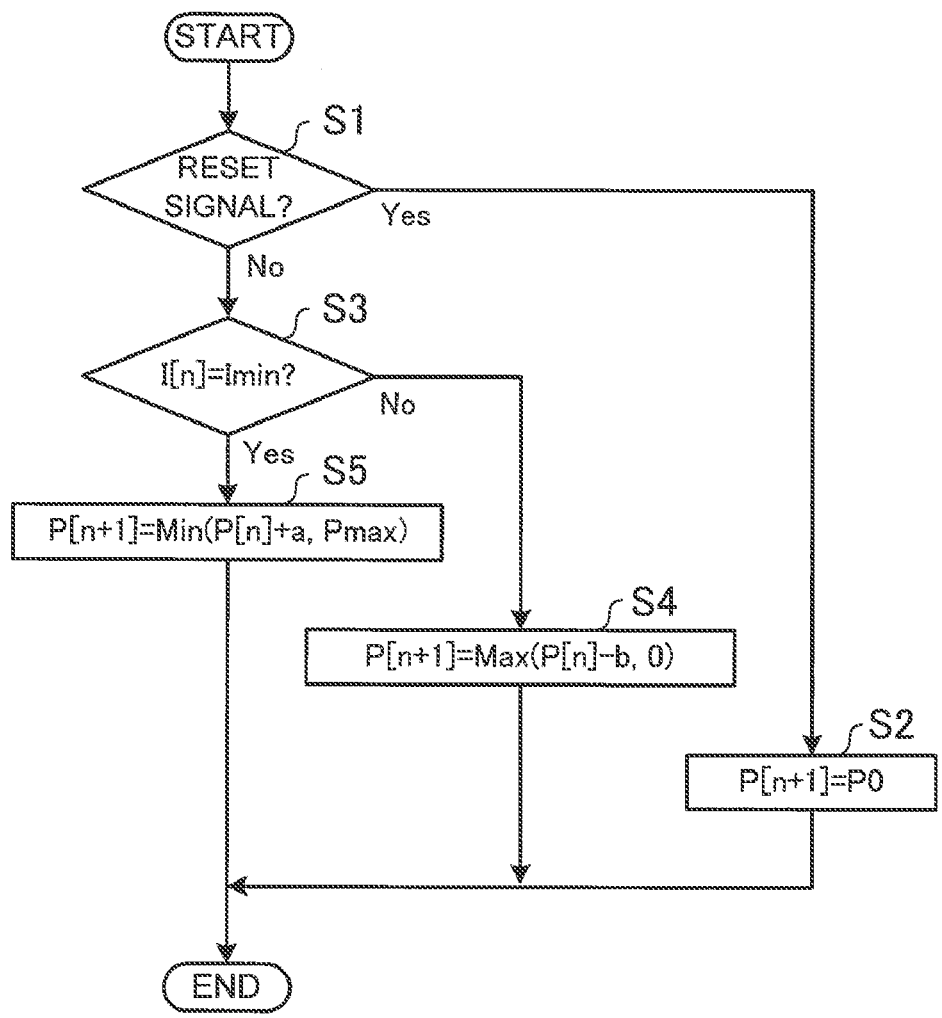
FIG. 6 is a flowchart showing an operation example of a correction unit.

FIG. 6 is a flowchart showing an operation example of the correction unit 52. Max(A, B) given below refers to a function that returns a larger value of A and B. Min(A, B) refers to a function that returns a smaller value of A and B. In addition, "a" and "b" both have values larger than "0". The correction unit 52 executes processing in accordance with the flowchart shown in FIG. 6, each time the value "n" of the counter is updated.

First, the correction unit 52 determines whether a reset signal is input or not (step S1).

The correction unit 52 resets the correction value P[n+1] to "P0" (step S2), when it is determined that a reset signal is input in the step S1 ("Yes" in S1). Then, the correction unit 52 ends the processing in accordance with the flowchart.

The correction unit 52 determines, when it is determined that no reset signal is input in the step S1 ("No" in S1), whether the previous stage current value I[n] is "Imin" or not (step S3).

The correction unit 52 calculates, when it is determined that the previous stage current value I[n] is not "Imin" in the step S3 ("No" in S3), a correction value P[n+1] on the basis of the following formula (4) (step S4).

$$P[n+1]=\text{Max}(P[n]-b,0) \quad (4)$$

More specifically, the correction unit 52 determines, as the correction value P[n+1], a larger value of: a value obtained by subtracting "b" from the correction value P[n]; and "0". Then, the correction unit 52 ends the processing in accordance with the flowchart.

The correction unit 52 calculates, when it is determined that the previous stage current value I[n] is "Imin" in the step S3 ("Yes" in S3), a correction value P[n+1] on the basis of the following formula (5) (step S5).

$$P[n+1]=\text{Min}(P[n]+a,P\max) \quad (5)$$

More specifically, the correction unit 52 determines, as the correction value P[n+1], a smaller value of: a value obtained by adding "a" to the correction value P[n]; and "Pmax" that is an upper limit of the correction value. Then, the correction unit 52 ends the processing in accordance with the flowchart.

Figure 7:
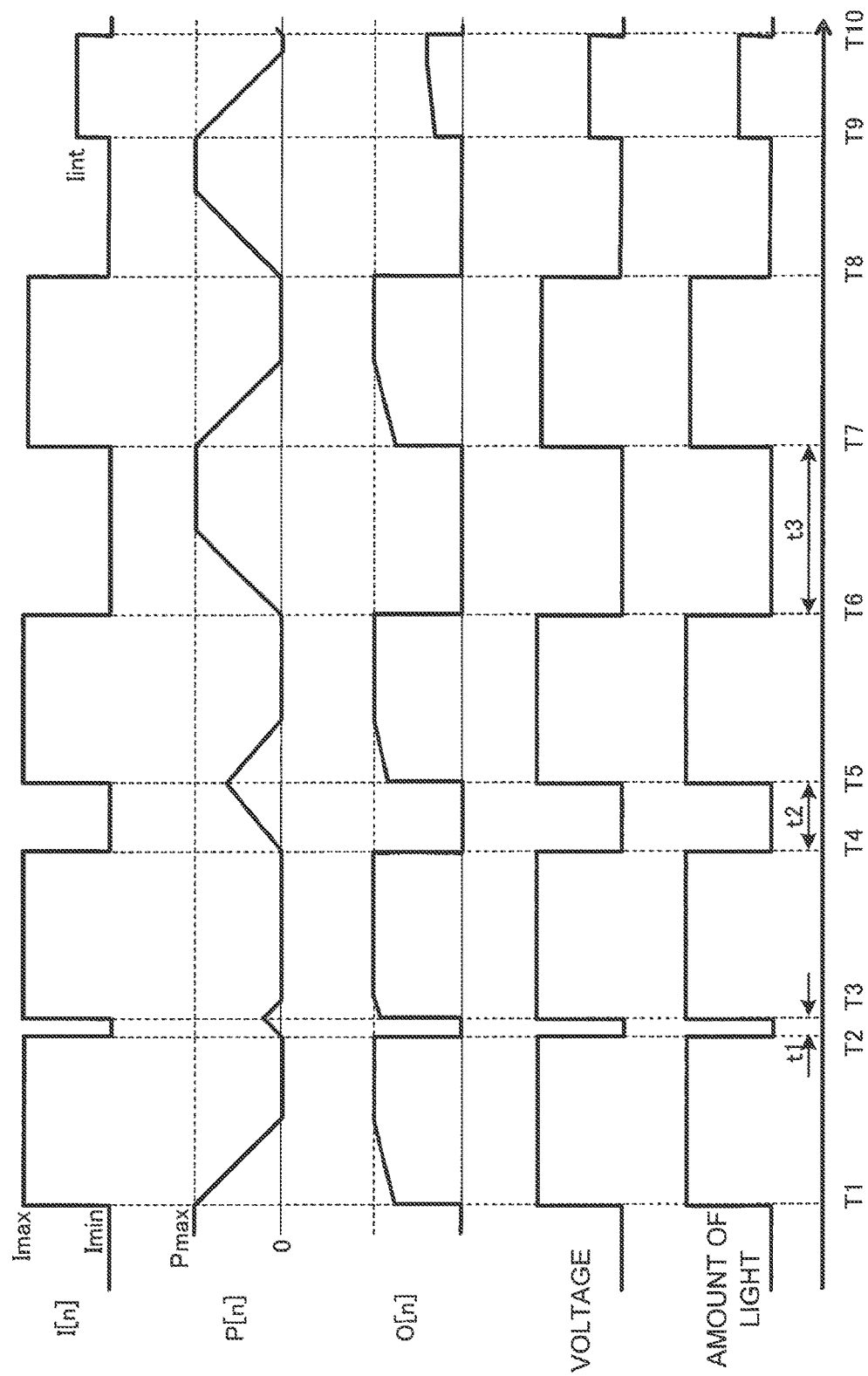
FIG. 7 is a timing chart for explaining an operation example of the correction unit.

FIG. 7 is a timing chart for explaining an operation example of the correction unit 52. FIG. 7 shows a timing chart in a case where the correction unit 52 executes the flowchart in FIG. 6.

The I[n] shown in FIG. 7 indicates a previous stage current value output from the gradation current unit 51 in FIG. 5. The P[n] shown in FIG. 7 indicates a correction value calculated by the correction unit 52. The O[n] shown in FIG. 7 indicates a subsequent stage current value for the current output by the correction unit 52 to the laser light source 32a. The "voltage" shown in FIG. 7 indicates a forward voltage generated in the laser light source 32a with the subsequent stage current value O[n]. The "amount of light" shown in FIG. 7 indicates the amount of light emitted by the laser light source 32a with the subsequent stage current value O[n]. The horizontal axis in FIG. 7 indicates time.

The "Imax" shown in FIG. 7 indicates the maximum value of the previous stage current value. For example, the "Imax" refers to a previous stage current value in the case of the largest gradation value. Specifically, when the gradation value changes "from 0 to 255", the "Imax" refers to a previous stage current value in the case of the gradation value of "255".

The "Imin" shown in FIG. 7 indicates the minimum value of the previous stage current value. For example, the "Imin" refers to a previous stage current value in the case of the smallest gradation value. Specifically, when the gradation value changes "from 0 to 255", the "Imin" refers to a previous stage current value in the case of the gradation value of "0".

The correction value is, as shown in FIG. 7, "0" when the previous stage current value "Imax" is kept for an adequately long period of time.

The correction unit 52 increases, when the previous stage current value is changed from the "Imax" to "Imin", the correction value until reaching the "Pmax", as shown by time periods "t1", "t2", and "t3" in FIG. 7. The increment per unit time is constant.

The correction value is larger as the previous stage current value "Imin" is kept for a longer period of time, as shown by the time periods "t1", "t2", and "t3" in FIG. 7. For example, the time period "t2" is longer than the time period "t1". Accordingly, the correction value at time "T5" is larger than the correction value at time "T3".

The correction unit 52 decreases, when the previous stage current value is changed from the "Imin" to "Imax", the correction value until reaching "0" with a constant decrement per unit time, as shown at the time "T3", the time "T5", and time "T7" in FIG. 7.

The correction unit 52 outputs, in accordance with the formula (1) and the formula (2), a subsequent stage current value that is smaller by the amount determined by the correction value than the previous stage current value. The correction value is larger as the previous stage current value "Imin" is kept for a longer period of time, and thus, when the previous stage current value is changed from the "Imin" to the "Imax", the subsequent stage current value is smaller as the previous stage current value is kept at the "Imin" for a longer period of time.

The parameter "a" that increases the correction value and the parameter "b" that decreases the correction value ("a" and "b" in the step S4 and S5 in FIG. 6) refer to values that cause the overshoot in accordance with the transient response characteristics of the laser light source 32 and the change with time in subsequent stage current value to cancel each other out. Thus, the overshoot of the forward voltage of the laser light source 32 is decreased after the previous stage current value is changed from the "Imin" to the "Imax", and the amount of light released by the laser light source 32 is also substantially constant after the previous stage current value is changed from the "Imin" to the "Imax".

As shown by the time periods "t1" and "t2" in FIG. 7, the correction value is assumed not to be "Pmax" when the duration of the previous stage current value "Imin" is short, and the previous stage current value is then changed from the "Imin" to "Imax". The correction value at the time when the previous stage current value is changed from the "Imin" to the "Imax" is a larger value, as the time period for which the previous stage current value is the "Imin" is longer during a predetermined period of time before the time. Thus, the correction unit 52 can suppress the overshoot of the forward voltage of the laser light source 32 with the use of the correction value. Further, the correction unit 52 can make the amount of light released by the laser light source substantially constant after the previous stage current value is changed from the "Imin" to "Imax".

As shown at time "T9" in FIG. 7, the previous stage current value is assumed to be changed from the "Imin" to the "Iint" (Imin<Iint<Imax). The overshoot amount of the forward voltage in the case of a change made from the "Imin" to "Iint" is smaller than the overshoot amount of the forward voltage overshoot in the case of a rapid change made from the "Imin" to "Imax". The gain correction value g(I[n]) described above refers to a coefficient for calculating a subsequent stage current value by, as the change in previous stage current value is larger, subtracting the large value from the previous stage current value. Thus, the change in subsequent stage current value and the transient response characteristics of the laser light source 32 cancel each other out, thereby reducing the overshoot of the forward voltage of the laser light source 32 after the previous stage current value is changed from the "Imin" to the "Iint".

Further, the amount of light released by the laser light source 32 is substantially constant after the previous stage current value is changed from the "Imin" to "Iint".

It is to be noted that the previous stage current value has been described above as being changed from the "Imin" to the "Imax" or from the "Imin" to the "Iint", but is not limited thereto. Even in the case of change from any current value to any current value between the "Imin" and the "Imax", the correction unit 52 controls the current applied to the laser light source 32, so as to reduce the overshoot of the forward voltage of the laser light source 32. Then, the correction unit 52 makes the amount of light emitted by the laser light source 32 substantially constant, thereby reducing luminance unevenness of the image I1.

In addition, the foregoing explanations have been provided, provided that the laser light source 32 has transient response characteristics in which the forward voltage undergoes an overshoot and converges to a predetermined voltage when the current value increases rapidly, but the laser light source is not limited thereto. Even when the forward voltage of the laser light source 32 converges to a predetermined voltage without undergoing any overshoot, for example, as in overdamping, the correction unit 52 can calculate the subsequent stage current value with the use of the formula (1), thereby compensating for the transient response characteristics of the laser light source 32. However, the "q" of the formula (1) in this case is expressed by the following formula (6):

$$q(P[n],I[n])=-g(I[n])\cdot P[n] \qquad (6)$$

More specifically, when the laser light source 32 has the characteristics of converging to a predetermined voltage without undergoing any overshoot, the correction part 52 adds g(I[n])·P[n] to the previous stage current value I[n] to increase the magnitude of the subsequent stage current value.

As described above, the correction unit 52 of the control unit 31 controls the driving current for the laser light source 32 at the second gradation value depending on the time period for which the first gradation value is set (depending on the time period for which the first current value flows), in the case of a change made from the first gradation value to the second gradation value (when the driving current applied to the laser light source 32 is changed from the first current value to the second current value). For example, the correction unit 52 controls, as described with reference to FIG. 7, the subsequent stage current values from the time "T3", the time "T5", and the time "T7" (the driving currents at the second gradation value) depending on the lengths of the time period "t1", time period "t2", and time period "t3". Thus, the image display device 2 can reduce luminance unevenness of images displayed on the screen 3.

In addition, the correction unit 52 changes, in proportion to the time period for which the first gradation value is set, the magnitude of the driving current for laser light source 32 at the second gradation value, thereby causing the driving current to converge to a current value corresponding to the second gradation value. For example, as described with reference to FIG. 7, the correction unit 52 reduces the magnitudes of the subsequent stage current values at the time "T3", the time "T5", and the time "T7", in proportion to the lengths of the time period "t1", time period "t2", and time period "t3". Then, the correction unit 52 causes the driving current for the laser light source 32 to converge to a current value (Imax) corresponding to the second gradation value. Thus, with the suppressed overshoot of the forward voltage of the laser light source 32, the image display device 2 can reduce luminance unevenness of images displayed on the screen 3.

In addition, the correction unit 52 changes, in proportion to the difference between the first gradation value and the second gradation value, the magnitude of the driving current, thereby causing the driving current to converge to a current value corresponding to the second gradation value. For example, as described with reference to FIG. 7, the difference between the "Imin" and the "Iint" is smaller than the difference between the "Imin" and the "Imax". Accordingly, the correction unit 52 makes the magnitude of a subsequent stage current value at the time "T9" smaller than the magnitude at the time "T7". Thus, with the suppressed overshoot of the forward voltage of the laser light source 32, the image display device 2 can reduce luminance unevenness of images displayed on the screen 3.

Second Embodiment

According to a second embodiment, a control unit 31 controls the interval of updating a correction value. The differences from the first embodiment will be described below.

Figure 8:
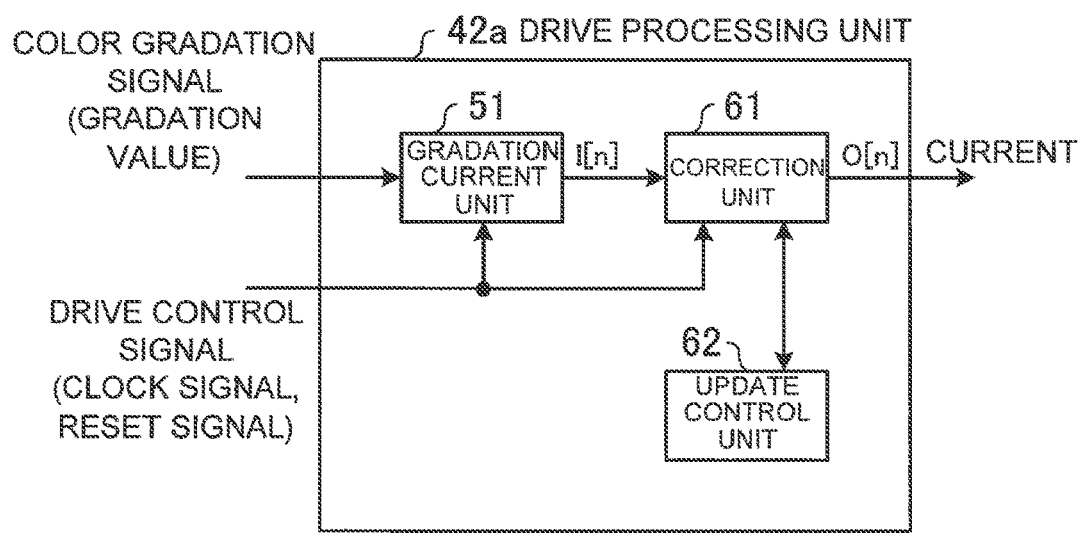
FIG. 8 is a diagram illustrating a block configuration example of a drive processing unit according to a second embodiment.

FIG. 8 is a diagram illustrating a block configuration example of a drive processing unit 42a according to the second embodiment. In FIG. 8, the same unit as that in FIG. 5 is denoted by the same reference numeral. As shown in FIG. 8, the drive processing unit 42a has a correction unit 61 and an update control unit 62.

The correction unit 61 outputs one or both of a previous stage current value and a correction value to the update control unit 62. The update control unit 62 controls the interval of updating the correction value of the correction unit 61 on the basis of one or both of the previous stage current value and correction value.

Hereinafter, "N" represents how many times the timing directed by a clock signal is skipped before updating a correction value P[n+1] to a value that is different from a correction value P[n]. The "N" represents an integer of 1 or more.

Figure 9:
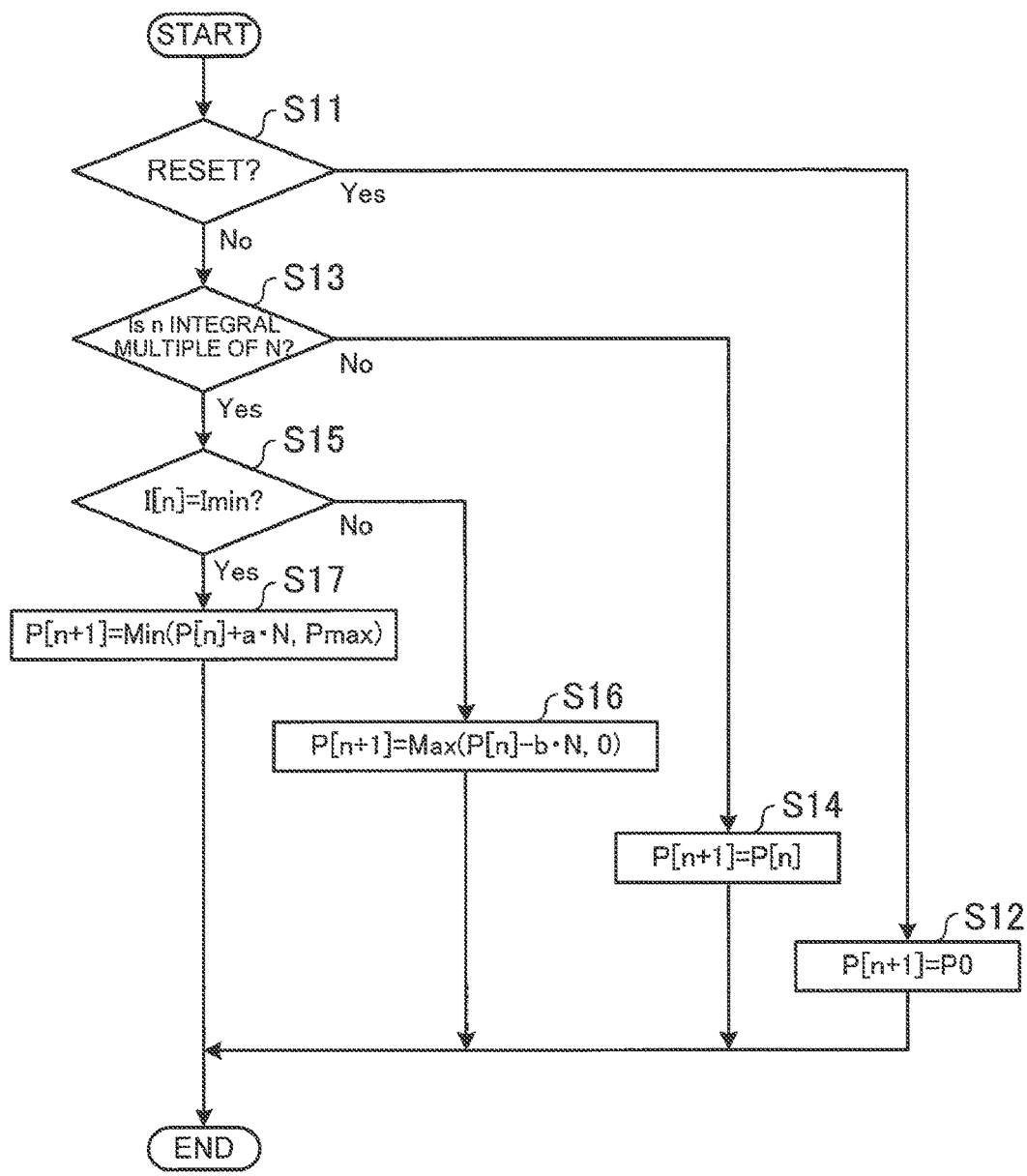
FIG. 9 is a flowchart showing an operation example of a correction unit.

FIG. 9 is a flowchart showing an operation example of the correction unit 61. The correction unit 61 executes processing in accordance with the flowchart shown in FIG. 9 each time the value "n" of a counter is updated. The processing in steps S11 and S12 as shown in FIG. 9 is executed in the same manner as the processing in the steps S1 and S2 as shown in FIG. 6, and the explanation of the processing will be left out.

The correction unit 61 determines, when it is determined that no reset signal is input in the step S11 ("No" in S11), whether the "n" is an integral multiple of the "N" or not (step S13).

The correction unit 61 changes, when it is determined that the "n" is not an integral multiple of the "N" in the step S13 ("No" in S13), the value of the correction value P[n+1] to the value of the previous correction value P[n] (step S14). Then, the correction unit 61 ends the processing in accordance with the flowchart.

The correction unit 61 determines, when it is determined that the "n" is an integral multiple of the "N" in the step S13 ("Yes" in S13), whether the previous stage current value I[n] is "Imin" or not (step S15).

The correction unit 61 calculates, when it is determined that the previous stage current value I[n] is not "Imin" in the step S15 ("No" in S15), a correction value P[n+1] on the basis of following formula (7) (step S16).

$$P[n+1]=\text{Max}(P[n]-b\cdot N,0) \qquad (7)$$

More specifically, the correction unit 61 updates the correction value P[n+1] to a value that is different from the correction value P[n], when the "n" is an integral multiple of the "N". Then, the correction unit 61 ends the processing in accordance with the flowchart.

It is to be noted that the "b·N" in the formula (7) indicates a decrement of the correction value P[n+1] with respect to the correction value P[n]. In the formula (7), the "b" is multiplied by the "N", and the decrement of the correction value P[n+1] updated by a single update is thus larger than that in the case of the formula (4). However, the decrement is unchanged on average because the update is executed after the timing directed by a clock signal is skipped N times.

The correction unit 61 calculates, when it is determined that the previous stage current value I[n] is "Imin" in the step S15 ("Yes" in S15), a correction value P[n+1] on the basis of following formula (8) (step S17).

$$P[n+1]=\text{Min}(P[n]+a\cdot N,P\max) \quad (8)$$

More specifically, the correction unit 61 updates the correction value P[n+1] to a value that is different from the correction value P[n], when the "n" is an integral multiple of the "N". Then, the correction unit 61 ends the processing in accordance with the flowchart.

It is to be noted that the "a·N" in the formula (8) indicates an increment of the correction value P[n+1] with respect to the correction value P[n]. In the formula (8), the "a" is multiplied by the "N", and the increment of the correction value P[n+1] updated by a single update is thus larger than that in the case of the formula (5). However, the increment is unchanged on average because the update is executed after the timing directed by a clock signal is skipped N times.

The update control unit 62 dynamically changes the "N" of the interval of updating the correction value of the correction unit 61, on the basis of one or both of the previous stage current value and correction value output from the correction unit 61.

For example, the update control unit 62 detects the maximum values and minimum values of I[n-M], I[n-M+1], . . . , I[n] with respect to predetermined "M" (M is an integer of 1 or more). The update control unit 62 sets the "N" to a value of "1" when the difference between the detected maximum value and minimum value of the previous stage current value before a certain period of time is larger than a predetermined value, or otherwise, sets "N" to a value of 2 or more.

Alternatively, for example, the update control unit 62 measures the change in correction value per unit time. The update control unit 62 sets the "N" to "1" when the change in correction value per unit time is larger than a predetermined value, or otherwise, sets "N" to a value of 2 or more.

Alternatively, for example, the update control unit 62 may set the "N" with the use of the two methods mentioned above. For example, the update control unit 62 may set the "N" to 2 or more when the difference between the maximum value and minimum value of the previous stage current value before a certain period of time is not larger than a predetermined value, or when the change in correction value per unit time is not larger than a predetermined value.

When the update control unit 62 sets "N=1", the correction unit 61 updates the correction value for each timing directed by a clock signal. Thus, the correction unit 61 can increase the degree of precision for reduced luminance unevenness of the image I1. Alternatively, the update control unit 62 sets the "N" to a value of 2 or more, the correction unit 61 can reduce the processing load. For example, when the "n" is not an integral multiple of the "N", the correction unit 61 has only to execute processing of assigning the correction value P[n] to the correction value P[n+1], rather than addition/subtraction processing or magnification determination processing, thus reducing the processing load.

As described above, the correction unit 61 of the control unit 31 changes the interval of updating the correction value, on the basis of one or both of the transition of the gradation value (previous stage current value) before a certain period of time and the change in the correction value per unit time. Thus, the image display device 2 can reduce luminance unevenness of the image I1, and reduce the processing load.

Third Embodiment

According to a third embodiment, the subsequent stage current value is changed in an exponential fashion, thereby increasing the effect of reducing luminance unevenness of the image I1. Block configuration examples of a control unit and a drive processing unit according to the third embodiment are configured respectively in the same fashion as the control unit 31 shown in FIG. 4 and the drive processing unit 42 shown in FIG. 5. However, the correction unit 52 of the drive processing unit 42 partially differs in processing details. The difference in the processing executed by the correction unit 52 will be described below.

Figure 10:
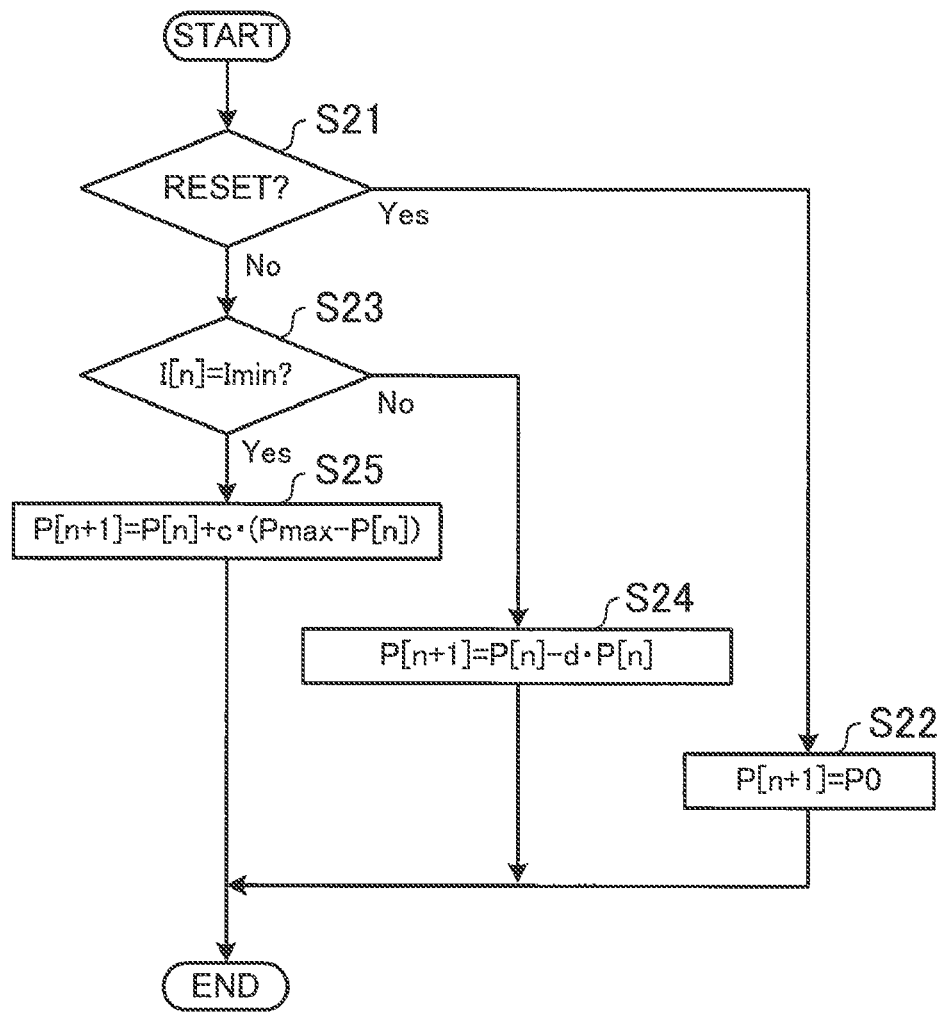
FIG. 10 is a flowchart showing an operation example of a correction unit according to a third embodiment.

FIG. 10 is a flowchart showing an operation example of the correction unit 52 according to the third embodiment. The correction unit 52 executes processing in accordance with the flowchart shown in FIG. 10 each time the value "n" of a counter is updated. The processing in steps S21 and S22 as shown in FIG. 10 is executed in the same manner as the processing in the steps S1 and S2 as shown in FIG. 6, and the explanation of the processing will be left out.

The correction unit 52 determines, when it is determined that no reset signal is input in the step S21 ("No" in S21), whether the previous stage current value I[n] is "Imin" or not (step S23).

The correction unit 52 calculates, when it is determined that the previous stage current value I[n] is not "Imin" in the step S23 ("No" in S23), a correction value P[n+1] on the basis of the following formula (9) (step S24).

$$P[n+1]=P[n]-d\cdot P[n] \quad (9)$$

Then, the correction unit 52 ends the processing in accordance with the flowchart.

The correction unit 52 calculates, when it is determined that the previous stage current value I[n] is "Imin" in the step S23 ("Yes" in S23), a correction value P[n+1] on the basis of following formula (10) (step S25).

$$P[n+1]=P[n]+c\cdot(P\max-P[n]) \quad (10)$$

Then, the correction unit 52 ends the processing in accordance with the flowchart.

It is to be noted that the "d" in the formula (9) and the "c" in the formula (10) both have values larger than "0". When the previous stage current value I[n] is equal to the "Imin" with respect to n=n0, n=n0+1, n=n0+2, . . . , the correction value P[n] behaves asymptotically to the "Pmax" in an exponential fashion. Alternatively, when the previous stage current value I[n] is not equal to the "Imin" with respect to n=n0, n=n0+1, n=n0+2, . . . , the P[n] behaves asymptotically to "0" in an exponential fashion.

As described above, the correction unit 52 causes the driving current for the laser light source 32 to converge to a current value corresponding to the second gradation value in an exponential fashion, when the gradation value is changed from the first gradation value to the second gradation value. Thus, the image display device 2 can further increase the effect of reducing luminance unevenness of the image I1.

For example, the forward voltage of the laser light source 32 in the case of a rapid increase in the current applied to the laser light source 32 undergoes an overshoot, and then converge to a predetermined value in an exponential fashion. The correction unit 52 changes the correction value in an exponential fashion, thereby changing the subsequent stage current value in an exponential fashion, and can thus further increase the effect of reducing luminance unevenness of the image I1.

Fourth Embodiment

According to a fourth embodiment, the correction value is changed in an exponential fashion toward a convergence value for the correction value determined by the previous stage current value. Thus, luminance unevenness of the image I1 is reduced even at intermediate gradation values other than the minimum gradation value and the maximum gradation value. Block configuration examples of a control unit and a drive processing unit according to the fourth embodiment are configured respectively in the same fashion as the control unit 31 shown in FIG. 4 and the drive processing unit 42 shown in FIG. 5. However, the correction unit 52 of the drive processing unit 42 partially differs in processing details. The difference in the processing executed by the correction unit 52 will be described below.

The correction unit 52 converts the previous stage current value to a convergence value for the correction value. For example, the correction unit 52 has a convergence value LUT (not shown) for the conversion of the correction value to a convergence value. The convergence value LUT stores the previous stage current value and a convergence value for the correction value at the previous stage current value, which are adapted to correspond to each other. The correction unit 52 refers to the convergence value LUT, thereby acquiring a convergence value for the correction value with respect to the previous stage current value. It is to be noted that the convergence value for the correction value is a smaller value as the previous stage current value is larger.

The correction unit 52 calculates a subsequent stage current value on the basis of the formula (1) mentioned above, when the forward voltage of the laser light source 32 undergoes an overshoot or an undershoot, and then converges to a predetermined voltage in an exponential fashion. However, the "q" of the formula (1) is expressed by the following formula (11).

$$q(P[n],I[n])=g \cdot (P[n]-Pinf(I[n])) \quad (11)$$

In this regard, the "g" of the formula (11) represents a constant that is larger than "0". In addition, the "Pinf(I[n])" of the formula (11) represents a convergence value for the correction value corresponding to the previous stage current value I[n]. The correction unit 52 can refer to the convergence value LUT described above, thereby acquiring the "Pinf(I[n])".

The correction unit 52 calculates a new (next) correction value P[n+1] on the basis of the following formula (12), for each timing directed by a clock signal.

$$P[n+1]=h(P[n],I[n],n) \quad (12)$$

In this regard, the "h" of the formula (12) represents a predetermined function, and the correction value changes as follows in accordance with the function h for each timing directed by a clock signal.

The correction value monotonically increases to the Pinf (I[n]) in the case of P[n]<Pinf(I[n]).

The correction value monotonically decreases to the Pinf (I[n]) in the case of P[n]>Pinf(I[n]).

It is to be noted that while a case where the forward voltage of the laser light source 32 undergoes an overshoot or an undershoot, and then converges to a predetermined voltage in an exponential fashion has been described above, the "q" of the formula (1) is expressed by the following formula (13) when the forward voltage of the laser light source 32 converges to a predetermined value in an exponential fashion without undergoing any overshoot or undershoot.

$$q(P[n],I[n])=-g \cdot (P[n]-Pinf(I[n])) \quad (13)$$

Figure 11:
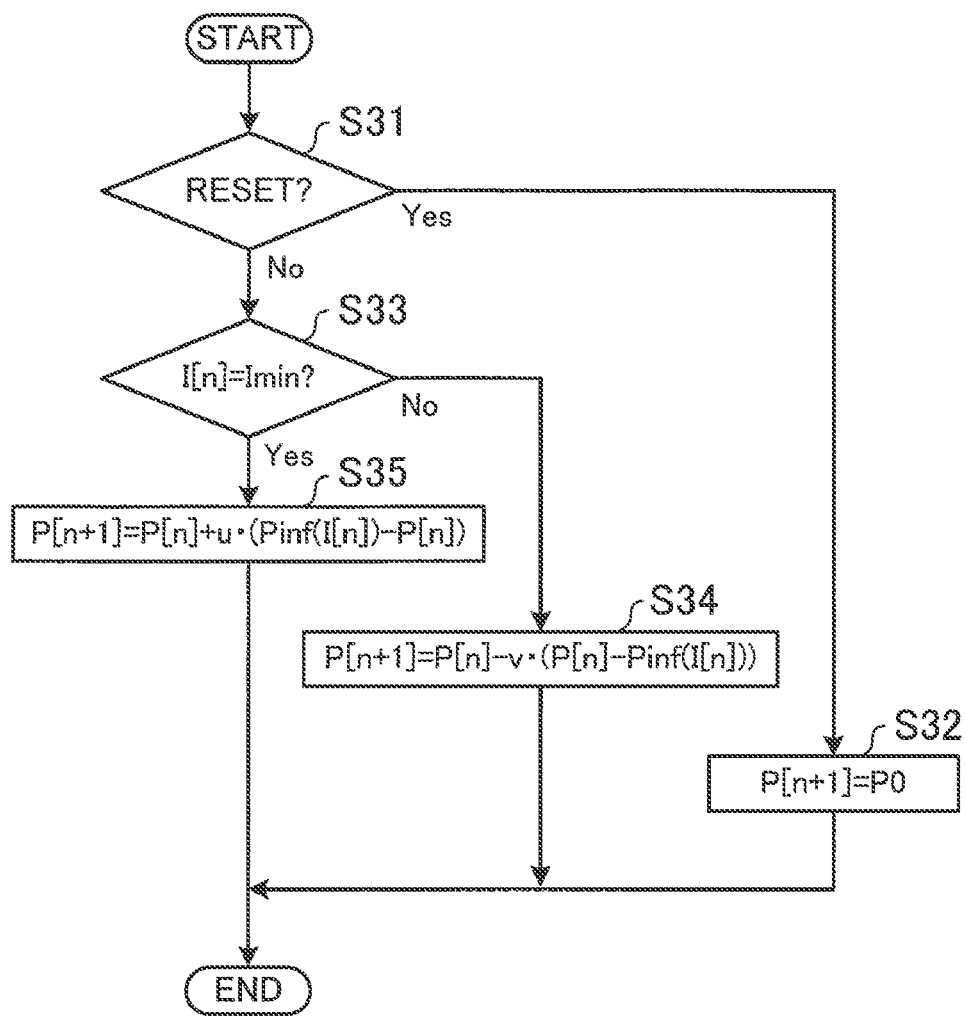
FIG. 11 is a flowchart showing an operation example of a correction unit according to a fourth embodiment.

FIG. 11 is a flowchart showing an operation example of the correction unit 52 according to the fourth embodiment. The correction unit 52 executes processing in accordance with the flowchart shown in FIG. 11, each time the value "n" of the counter is updated. The processing in steps S31 and S32 as shown in FIG. 11 is executed in the same manner as the processing in the steps S1 and S2 as shown in FIG. 6, and the explanation of the processing will be left out.

The correction unit 52 determines, when it is determined that no reset signal is input in the step S31 ("No" in S31), whether the previous stage current value I[n] is "Imin" or not (step S33).

The correction unit 52 calculates, when it is determined that the previous stage current value I[n] is not "Imin" in the step S33 ("No" in S33), a correction value P[n+1] on the basis of the following formula (14) (step S34).

$$P[n+1]=P[n]-v \cdot (P[n]-Pinf(I[n])) \quad (14)$$

Then, the correction unit 52 ends the processing in accordance with the flowchart.

The correction unit 52 calculates, when it is determined that the previous stage current value I[n] is "Imin" in the step S33 ("Yes" in S33), a correction value P[n+1] on the basis of the following formula (15) (step S35).

$$P[n+1]=P[n]+u \cdot (Pinf(I[n])-P[n]) \quad (15)$$

Then, the correction unit 52 ends the processing in accordance with the flowchart.

It is to be noted that the "v" in the formula (14) and the "u" in the formula (15) both have values larger than "0". When the P[n] is smaller than the "Pinf(I[n])" with respect to n=n0, n=n0+1, n=n0+2, ..., the correction value P[n] increases with behaving asymptotically to the "Pinf(I[n])" in an exponential fashion. Alternatively, when the P[n] is larger than the "Pinf(I[n])" with respect to n=n0, n=n0+1, n=n0+2, ..., the correction value P[n] decreases with behaving asymptotically to the "Pinf(I[n])" in an exponential fashion.

Figure 12:
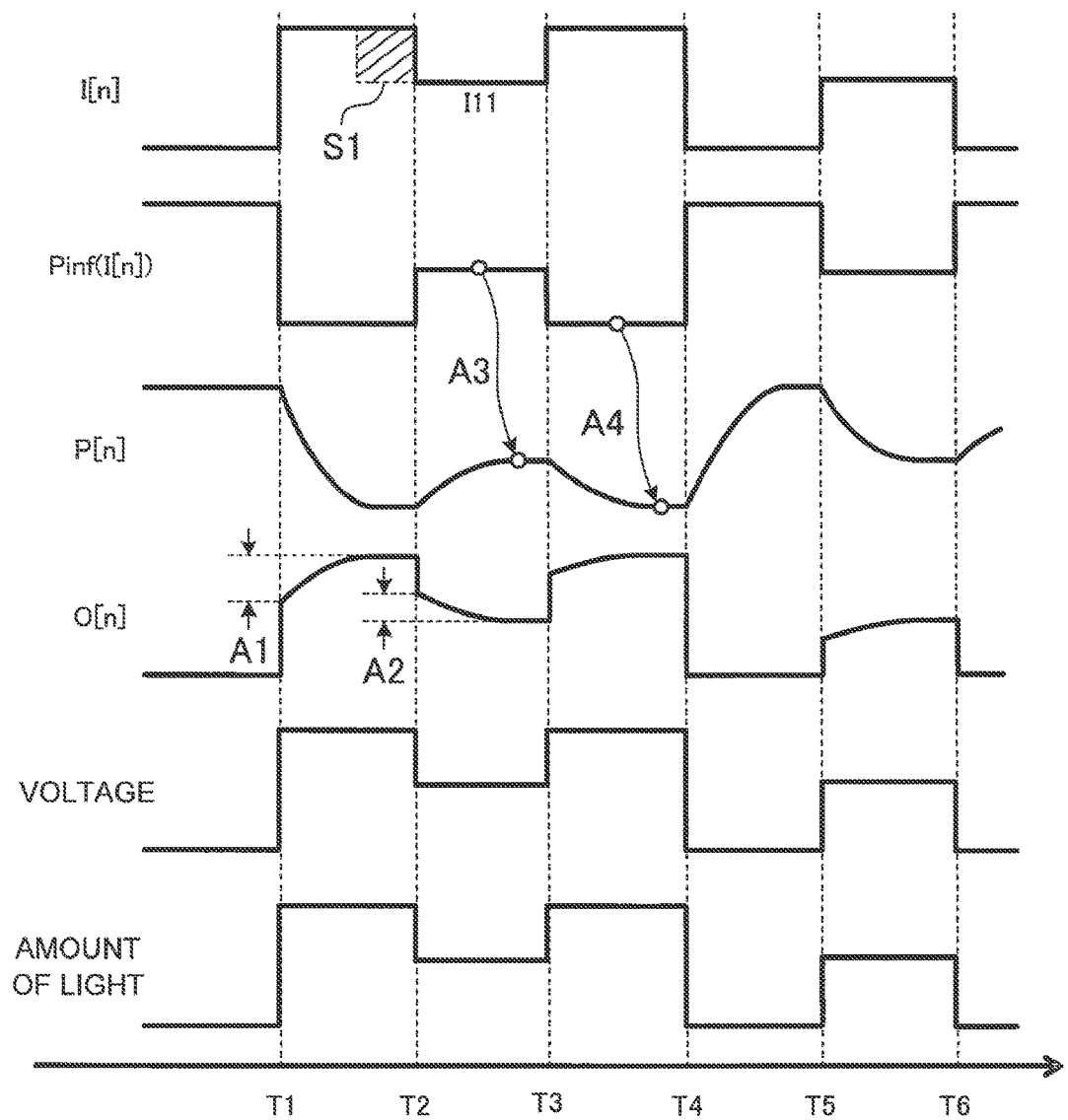
FIG. 12 is a timing chart for explaining an operation example of the correction unit.

FIG. 12 is a timing chart for explaining an operation example of the correction unit 52. FIG. 12 shows a timing chart in a case where the correction unit 52 executes the flowchart in FIG. 11. FIG. 12 illustrates a case where the forward voltage of the laser light source 32 undergoes an overshoot and an undershoot.

The I[n] shown in FIG. 12 indicates a previous stage current value output from the gradation current unit 51 in FIG. 5. The Pinf(I[n]) shown in FIG. 12 indicates a convergence value for the correction value, acquired by the correction unit 52 referring to the convergence value LUT. The P[n] shown in FIG. 12 indicates a correction value calculated by the correction unit 52. The O[n] shown in FIG. 12 indicates a subsequent stage current value output by the correction unit 52 to the laser light source 32a. The "voltage" shown in FIG. 12 indicates a forward voltage generated in the laser light source 32a with the subsequent stage current value O[n]. The "amount of light" shown in FIG. 12 indicates the amount of light emitted by the laser light source

32a with the subsequent stage current value O[n]. The horizontal axis in FIG. 12 indicates time.

As shown at time "T1", when the previous stage current value increases rapidly with a change from a first gradation value to a second gradation value that is larger than the first gradation value, the subsequent stage current value is smaller than the current value corresponding to the second gradation value with a difference value determined by the correction value (an arrow A1 in FIG. 12). The subsequent stage current value thereafter converges to the current value corresponding to the second gradation value with increasing in an exponential fashion. The decrement (arrow A1) of the subsequent stage current value and the transient response characteristics of the laser light source 32 cancel each other out, thereby reducing the overshoot of the forward voltage of the laser light source 32, and also making the amount of light emitted by the laser light source 32 substantially constant.

As shown at time "T2", when the previous stage current value decreases rapidly with a change from a first gradation value to a second gradation value that is smaller than the first gradation value, the subsequent stage current value is larger than the current value corresponding to the second gradation value with a difference value determined by the correction value (an arrow A2 in FIG. 12). The subsequent stage current value thereafter converges to the current value corresponding to the second gradation value with decreasing in an exponential fashion. The increment (arrow A2) of the subsequent stage current value and the transient response characteristics of the laser light source 32 cancel each other out, thereby reducing the undershoot of the forward voltage of the laser light source 32, and also making the amount of light emitted by the laser light source 32 substantially constant.

The convergence value for the correction value is determined by the previous stage current value, as shown by the I[n] and the Pinf(I[n]) in FIG. 12. Then, for example, as indicated by arrows A3 and A4, the correction value converges in an exponential fashion toward the convergence value determined by the previous stage current value.

The absolute value (arrow A2) of the difference between the subsequent stage current value at the time of the change in previous stage current value (for example, the time "T2") and the current value to which the subsequent stage current value converges is larger as the absolute value of time integration (diagonal strokes S1 in FIG. 12) of a difference is larger between the previous stage current value before a predetermined period of time from the time "T2" and the previous stage current value at the time "T2".

As described with reference to FIG. 3, the increased change in the current applied to the laser light source 32 increases the overshoot and undershoot of the forward voltage of the laser light source 32. The correction unit 52 according to the fourth embodiment calculates a subsequent stage current value in response to the overshoot amount and undershoot amount of the forward voltage of the laser light source 32, even when the previous stage current value has a current value corresponding to an intermediate gradation value that is not either the "Imax" or the "Imin". Thus, the overshoot amount and undershoot amount of the forward voltage of the laser light source 32 are reduced, and the amount of light emitted by the laser light source 32 are also made substantially constant.

While a case where the forward voltage of the laser light source 32 undergoes an overshoot and an undershoot has been illustrated in FIG. 12, the same applies to a case of converging to a predetermined value in an overdamping fashion without undergoing any overshoot or undershoot.

However, in this case, when the previous stage current value increases rapidly with a change from a first gradation value to a second gradation value that is larger than the first gradation value, the subsequent stage current value is larger than the current value corresponding to the second gradation value with a difference value determined by the correction value. The subsequent stage current value thereafter converges to the current value corresponding to the second gradation value with decreasing in an exponential fashion. The increment of the subsequent stage current value and the transient response characteristics of the laser light source 32 cancel each other out, thereby making the amount of light emitted by the laser light source 32 substantially constant.

In addition, when the previous stage current value decreases rapidly with a change from a first gradation value to a second gradation value that is smaller than the first gradation value, the subsequent stage current value is smaller than the current value corresponding to the second gradation value with a difference value determined by the correction value. The subsequent stage current value thereafter converges to the current value corresponding to the second gradation value with increasing in an exponential fashion. The decrement of the subsequent stage current value and the transient response characteristics of the laser light source 32 cancel each other out, thereby making the amount of light emitted by the laser light source 32 substantially constant.

As described above, the correction unit 52 causes the correction value to converge in an exponential fashion to a convergence value depending on the magnitude of the previous stage current value. For example, the correction unit 52 causes, when the previous stage current value is "I11" as shown in FIG. 12, the correction value to converge in an exponential fashion to the convergence value indicated by an arrow A3 depending on the magnitude of the previous stage current value "I11". Thus, the correction unit 52 can reduce luminance unevenness of the image I1, even when the driving current for the laser light source 32 has a current value corresponding to an intermediate gradation value.

In addition, the correction unit 52 makes, on the basis of the transient response characteristics of the forward voltage of the laser light source 32 and the magnitude relationship between the first gradation value and the second gradation value, the subsequent stage current value in the case of changing the gradation value smaller or larger than the current value corresponding to the second gradation value, and causes the subsequent stage current value to converge to the current value corresponding to the second gradation value.

For example, the laser light source 32 is assumed to have overshoot characteristics, and the second gradation value is assumed to be larger than the first gradation value. In this case, the correction unit 52 makes the subsequent stage current value in the case of a change from the first gradation value to the second gradation value smaller than the current value corresponding to the second gradation value, and causes the subsequent stage current value to converge to the current value corresponding to the second gradation value.

Alternatively, the laser light source 32 is assumed to have undershoot characteristics, and the second gradation value is assumed to be smaller than the first gradation value. In this case, the correction unit 52 makes the subsequent stage current value in the case of a change from the first gradation value to the second gradation value larger than the current value corresponding to the second gradation value, and causes the subsequent stage current value to converge to the current value corresponding to the second gradation value.

Alternatively, the laser light source 32 is assumed to have the characteristics of converging to a predetermined voltage without undergoing any overshoot, and the second gradation value is assumed to be larger than the first gradation value. In this case, the correction unit 52 makes the subsequent stage current value in the case of a change from the first gradation value to the second gradation value larger than the current value corresponding to the second gradation value, and causes the subsequent stage current value to converge to the current value corresponding to the second gradation value.

Alternatively, the laser light source 32 is assumed to have the characteristics of converging to a predetermined voltage without undergoing any undershoot, and the second gradation value is assumed to be smaller than the first gradation value. In this case, the correction unit 52 makes the subsequent stage current value in the case of a change from the first gradation value to the second gradation value smaller than the current value corresponding to the second gradation value, and causes the subsequent stage current value to converge to the current value corresponding to the second gradation value.

Thus, the correction unit 52 can reduce luminance unevenness of the image I1, even when the driving current for the laser light source 32 has a current value corresponding to an intermediate gradation value.

Fifth Embodiment

According to a fifth embodiment, the subsequent stage current value is shifted with multiple different time constants. Thus, even when a laser light source has transient response characteristics with multiple different time constants, luminance unevenness of the image I1 can be reduced. According to the fifth embodiment, a block configuration example of a drive processing unit differs from the block configuration example of the drive processing unit 42a according to the first embodiment.

Figure 13:
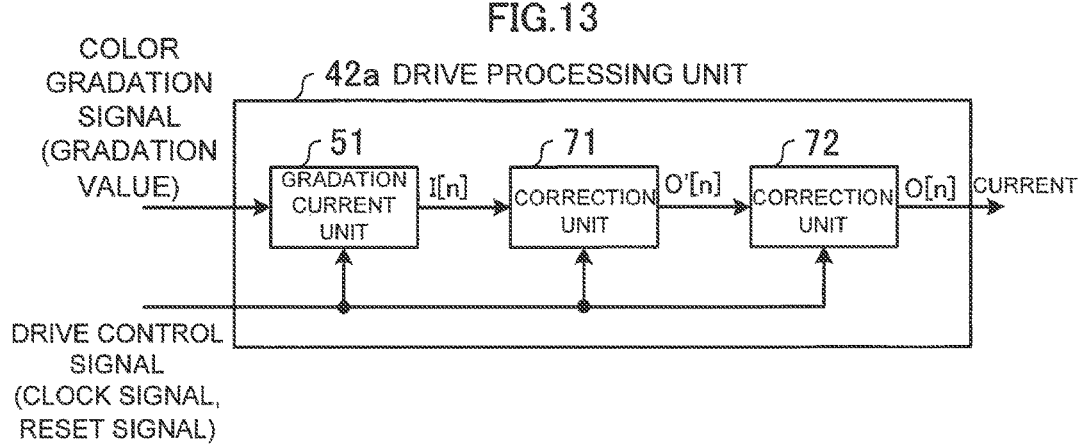
FIG. 13 is a diagram illustrating a block configuration example of a drive processing unit according to a fifth embodiment.

FIG. 13 is a diagram illustrating a block configuration example of a drive processing unit 42a according to the fifth embodiment. In FIG. 13, the same unit as that in FIG. 5 is denoted by the same reference numeral. As shown in FIG. 13, the drive processing unit 42a has two correction units 71 and 72. The correction units 71 and 72 operate in the same way as the correction unit 52 in FIG. 5, but each differ in calculation of different correction values.

The correction unit 71 inputs a previous stage current value I[n] output from a gradation current unit 51, and outputs a middle stage current value O'[n] calculated from the previous stage current value I[n] and a correction value P[n].

The correction unit 72 inputs the middle stage current value O'[n] output from the correction unit 71, and outputs a subsequent stage current value O[n] calculated from the middle stage current value O'[n] and a correction value P'[n]. The two correction units 71 and 72 are configured to compensate respectively for transient response characteristics of a laser light source 32 with two different time constants.

Figure 14:
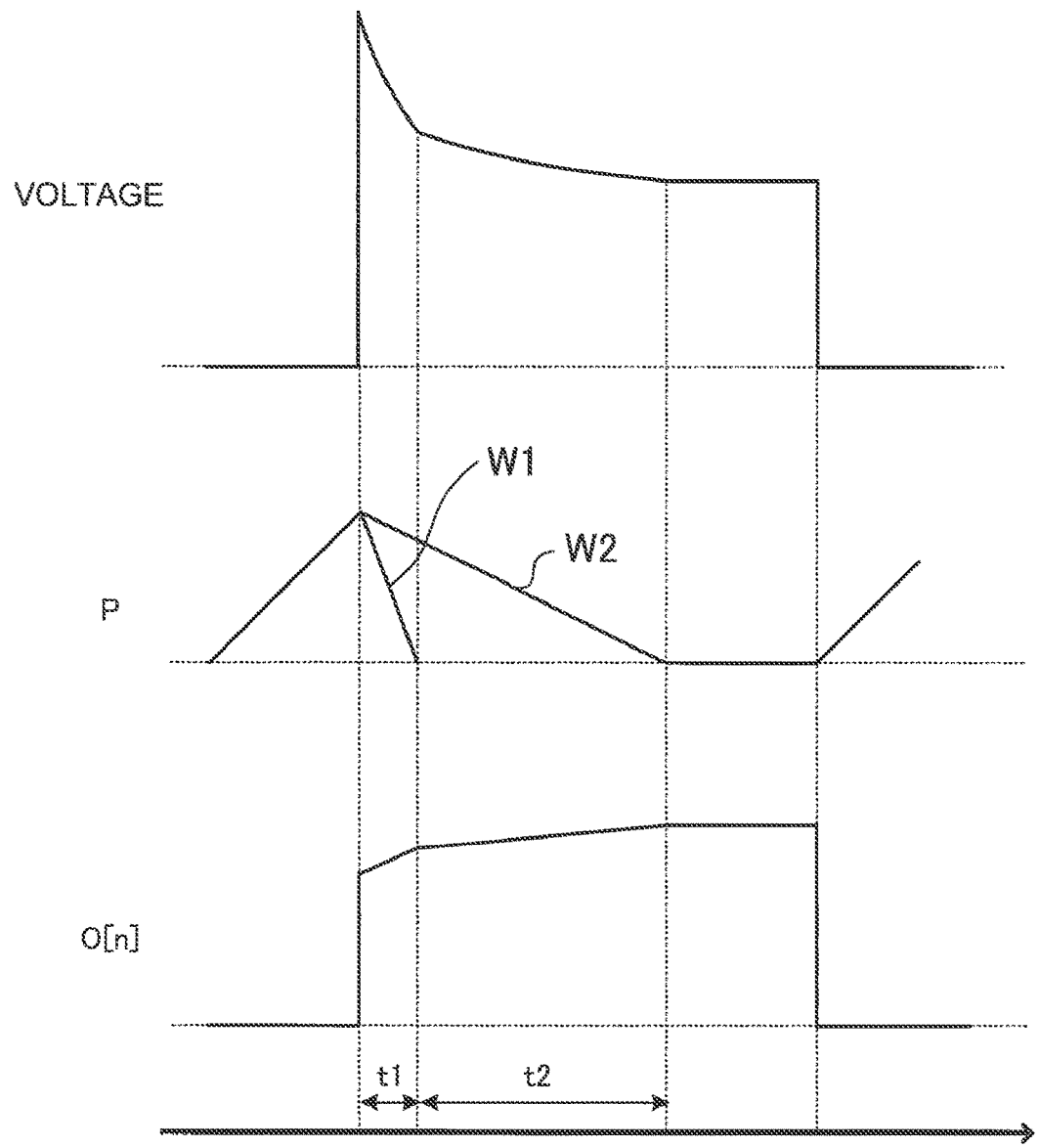
FIG. 14 is a diagram for explaining two time constants, a correction value, and a subsequent stage current value for a laser light source.

FIG. 14 is a diagram for explaining the two time constants, correction value, and subsequent stage current value for the laser light source 32. The horizontal axis in FIG. 14 indicates time.

The "voltage" shown in FIG. 14 indicates the forward voltage of the laser light source 32. As shown by time periods "t1" and "t2" in FIG. 14, the laser light source 32 undergoes an overshoot, and then converges to a predetermined voltage with the two different time constants.

The "P" shown in FIG. 14 indicates correction values calculated by the correction units 71 and 72. The waveform W1 shown in FIG. 14 indicates a change in the correction value P[n] calculated by the correction unit 71, whereas the waveform W2 therein indicates a change in the correction value P'[n] calculated by the correction unit 72.

The "O[n]" shown in FIG. 14 indicates a subsequent stage current value output from the correction unit 72. As shown by the time periods "t1" and "t2" in FIG. 14, the subsequent stage current value converges to a predetermined current value at two different convergent rates.

As just described, the subsequent stage current value has the two different time constants. Thus, even when the laser light source 32 has transient response characteristics with two different time constants, the variation of the subsequent stage current value and the transient response characteristics of the laser light source 32 cancel each other out, thereby making it possible to reduce the overshoot or undershoot of the forward voltage of the laser light source 32. Further, the amount of light emitted by the laser light source 32 is made substantially constant.

It is to be noted that while the subsequent stage current value with the two time constants is output through the two correction units 71 and 72 as mentioned above, one correction unit may cause, at two different convergent rates, a subsequent stage current value to converge to a predetermined current value. In this case, one correction unit calculates a subsequent stage current value on the basis of the following formula (16).

$$O[n]=I[n]-q(P1[n],I[n])-q(P2[n],I[n]) \quad (16)$$

The $P1[n]$ and $P2[n]$ of the formula (16) represent correction values.

Further, the laser light source 32 is adapted to have two time constants as mentioned above, but may have three or more time constants. In this case, correction units may cause a subsequent stage current value to converge at three or more different convergent rates with the use of correction values respectively corresponding to the three or more time constants.

As described above, the correction units 71 and 72 cause the driving current for the laser light source 32 to converge at convergent rates respectively corresponding to the multiple time constants of the laser light source 32. Thus, the image display device 2 can reduce luminance unevenness even when the laser light source 32 have multiple time constants.

Sixth Embodiment

According to a sixth embodiment, the output of a laser light source 32 is monitored, thereby controlling a subsequent stage current value so as to reduce the deviation of the amount of emitted light corresponding to a gradation value.

Figure 15:
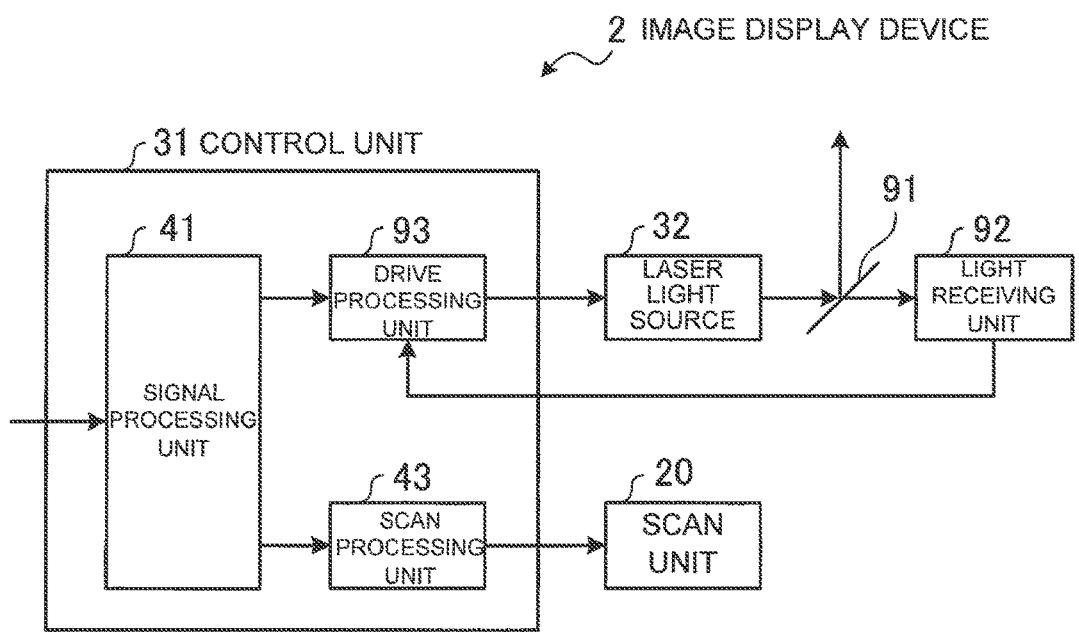
FIG. 15 is a block configuration example of an image display device according to a sixth embodiment.

FIG. 15 is a block configuration example of an image display device 2 according to the sixth embodiment. As shown in FIG. 15, the image display device 2 has a scan unit 20, a control unit 31, a laser light source 32, a partially transmitting mirror 91, and a light receiving unit 92. In FIG. 15, the same units as those according to the first embodiment are denoted by the same reference numerals.

The partially transmitting mirror 91 partially transmits laser light emitted from the laser light source 32.

The light receiving unit 92 receives laser light partially transmitted by the partially transmitting mirror 91. The light receiving unit 92 outputs the light intensity value of the laser light received (the amount of light) to a drive processing unit 93 of the control unit 31.

The drive processing unit 93 operates in the same way as the drive processing unit 42a described with reference to FIG. 5. However, the drive processing unit 93 changes, on the basis of the light intensity value output from the light receiving unit 92, values "a" and "b" for update of correction values (see the steps S4 and S5 in FIG. 6) and a gain correction value g (I[n]).

As just described, the drive processing unit 93 monitors the amount of light from the laser light source 32, and controls the driving current depending on the monitored amount of light. Thus, the image display device 2 can reduce luminance unevenness of the image I1.

While the present invention has been described above with reference to the embodiments, the configuration of the image display device is divided depending on main processing details for ease of understanding. The invention of the present application is never limited by how to divide constituent elements or the names of constituent elements. The configuration of the image display device can be also divided into more constituent elements, depending on processing details. In addition, the configuration can be also divided such that one constituent element executes more processing. In addition, the processing for each constituent element may be executed by one type of hardware, or executed by multiple type of hardware.

In addition, as for the respective processing units in the flowcharts described above, the processing in the image display device is divided depending on main processing details for ease of understanding. The invention of the present application is never limited by how to divide the processing units or the names of the processing units. The processing in the image display device can be also divided into more processing units, depending on processing details. In addition, the processing can be also divided such that one processing unit includes more processing.

In addition, the technical scope of the present invention is not limited to what is described in the embodiments mentioned above. It is obvious to one skilled in the art that various modifications or improvements can be made to the embodiments. In addition, it is obvious from what is claimed that the technical scope of the present invention can also encompass embodiments with such modifications or improvements made thereto. Furthermore, the respective embodiments can be combined with each other.

In addition, the locations, sizes, shapes, ranges, and the like for each configuration as illustrated in the drawings and the like may be kept from representing the actual locations, sizes, shapes, ranges, and the like in some case, for ease of understanding the invention. For this reason, the present invention is not necessarily limited to the locations, sizes, shapes, ranges, or the like disclosed in the drawings and the like.

REFERENCE SIGNS LIST

1: IMAGE DISPLAY SYSTEM, 2: IMAGE DISPLAY DEVICE, 3: SCREEN, 10: LASER LIGHT SOURCE UNIT, 20: SCAN UNIT, 21: SCAN ELEMENT, 31: CONTROL UNIT, 32a: LASER LIGHT SOURCE, 32b: LASER LIGHT SOURCE, 32c: LASER LIGHT SOURCE, 33a: DICHROIC MIRROR, 33b: DICHROIC MIRROR, 41: SIGNAL PROCESSING UNIT, 42a: DRIVE PROCESSING UNIT, 42b: DRIVE PROCESSING UNIT, 42c: DRIVE PROCESSING UNIT, 43: SCAN PROCESSING UNIT, 51: GRADATION CURRENT UNIT, 52: CORRECTION UNIT, 61: CORRECTION UNIT, 62: UPDATE CONTROL UNIT, 71: CORRECTION UNIT, 72: CORRECTION UNIT, 91: PARTIALLY TRANSMITTING MIRROR, 92: LIGHT RECEIVING UNIT, 93: DRIVE PROCESSING UNIT

The invention claimed is:

1. An image display device comprising:
   a light source configured to change an amount of light, depending on a driving current; and
   a control unit configured to, when a change is made from a first gradation value to a second gradation value, control the driving current at the second gradation value, depending on a time period for which the first gradation value is set,
   wherein the control unit causes the driving current to converge in an exponential fashion to a current value corresponding to the second gradation value.

2. The image display device according to claim 1, wherein the control unit changes the magnitude of the driving current in proportion to a time period for which the first gradation value is set, and causes the driving current to converge to the current value corresponding to the second gradation value.

3. The image display device according to claim 1, wherein the control unit changes the magnitude of the driving current in proportion to a difference between the first gradation value and the second gradation value, and causes the driving current to converge to the current value corresponding to the second gradation value.

4. The image display device according to claim 1, wherein the control unit calculates a correction value that has a magnitude in proportion to a time period for which the first gradation value is set, and adds or subtracts the correction value to or from the current value corresponding to the second gradation value, thereby causing the driving current to converge to the current value corresponding to the second gradation value.

5. The image display device according to claim 4, wherein the control unit changes an interval of updating the correction value, on the basis of one or both of a transition of a gradation value before a certain period of time and a change in the correction value per unit time.

6. An image display device comprising:
   a light source configured to change an amount of light, depending on a driving current; and
   a control unit configured to, when a change is made from a first gradation value to a second gradation value, control the driving current at the second gradation value, depending on a time period for which the first gradation value is set,
   wherein the control unit causes the correction value to converge in an exponential fashion to a convergence value depending on the magnitude of a current value corresponding to the second gradation value.

7. The image display device according to claim 1, wherein the correction unit makes, on the basis of transient response characteristics of a voltage of the light source and a magnitude relationship between the first gradation value and the second gradation value, the driving current smaller or larger than the current value corresponding to the second gradation value, and causes the driving current to converge to the current value corresponding to the second gradation value.

8. The image display device according to claim 1,
wherein the light source comprises multiple time constants for the amount of light, and
the control unit cause the driving current to converge at convergent rates respectively corresponding to the multiple time constants, for causing the driving current to converge to the current value corresponding to the second gradation value.

9. The image display device according to claim 1,
wherein the control unit monitors the amount of light of the light source, and controls the driving current depending on the monitored amount of light.

10. The image display device according to claim 6,
wherein the control unit changes the magnitude of the driving current in proportion to a time period for which the first gradation value is set, and causes the driving current to converge to the current value corresponding to the second gradation value.

11. The image display device according to claim 6,
wherein the control unit changes the magnitude of the driving current in proportion to a difference between the first gradation value and the second gradation value, and causes the driving current to converge to the current value corresponding to the second gradation value.

12. The image display device according to claim 6,
wherein the control unit calculates a correction value that has a magnitude in proportion to a time period for which the first gradation value is set, and adds or subtracts the correction value to or from the current value corresponding to the second gradation value, thereby causing the driving current to converge to the current value corresponding to the second gradation value.

13. The image display device according to claim 12,
wherein the control unit changes an interval of updating the correction value, on the basis of one or both of a transition of a gradation value before a certain period of time and a change in the correction value per unit time.

14. The image display device according to claim 6,
wherein the correction unit makes, on the basis of transient response characteristics of a voltage of the light source and a magnitude relationship between the first gradation value and the second gradation value, the driving current smaller or larger than the current value corresponding to the second gradation value, and causes the driving current to converge to the current value corresponding to the second gradation value.

15. The image display device according to claim 6,
wherein the light source comprises multiple time constants for the amount of light, and
the control unit cause the driving current to converge at convergent rates respectively corresponding to the multiple time constants, for causing the driving current to converge to the current value corresponding to the second gradation value.

16. The image display device according to claim 6,
wherein the control unit monitors the amount of light of the light source, and controls the driving current depending on the monitored amount of light.

* * * * *